United States Patent
Hashemi Talkhooncheh et al.

(10) Patent No.: US 12,001,115 B2
(45) Date of Patent: Jun. 4, 2024

(54) OPTICAL MODULATOR AND METHOD OF USE

(71) Applicants: ROCKLEY PHOTONICS LIMITED, Altrincham (GB); CALIFORNIA INSTITUTE OF TECHNOLOGY, Pasadena, CA (US)

(72) Inventors: Arian Hashemi Talkhooncheh, Pasadena, CA (US); Azita Emami, Pasadena, CA (US); Yi Zhang, Pasadena, CA (US); Aaron Zilkie, Pasadena, CA (US)

(73) Assignees: Rockley Phonics Limited, Altrincham (GB); California Institute of Technology, Pasadena, CA (US)

( * ) Notice: Subject to any disclaimer, the term of this patent is extended or adjusted under 35 U.S.C. 154(b) by 0 days.

(21) Appl. No.: 17/712,036

(22) Filed: Apr. 1, 2022

(65) Prior Publication Data
US 2022/0229340 A1 Jul. 21, 2022

Related U.S. Application Data

(63) Continuation-in-part of application No. 16/494,675, filed as application No. PCT/EP2018/056540 on Mar. 15, 2018, now Pat. No. 11,296,794.
(Continued)

(51) Int. Cl.
*G02F 1/21* (2006.01)
*G02F 1/01* (2006.01)
(Continued)

(52) U.S. Cl.
CPC .......... *G02F 1/212* (2021.01); *G02F 1/225* (2013.01); *H04B 10/541* (2013.01); *G02F 1/0121* (2013.01)

(58) Field of Classification Search
CPC .......... H04B 10/5053; H04B 10/541; H04B 10/524; G02F 1/015; G02F 1/2257;
(Continued)

(56) References Cited

U.S. PATENT DOCUMENTS 6,211,996 B1 4/2001 Fuse
6,650,458 B1 * 11/2003 Prosyk .................. G02F 1/225
385/9
(Continued)

FOREIGN PATENT DOCUMENTS

CA 0933963 A2 * 8/1999 ............. H04Q 11/00
CN 106483686 A 3/2017
(Continued)

OTHER PUBLICATIONS

Chinese Notification of the First Office Action, for Patent Application No. 201880002544.8, mailed Jan. 19, 2023, 9 pages.
(Continued)

*Primary Examiner* — Abbas H Alagheband
(74) *Attorney, Agent, or Firm* — Lewis Roca Rothgerber Christie LLP

(57) ABSTRACT

An optical device. In some embodiments, the device comprises: an input waveguide, configured to receive light; a first electro-absorption modulator, coupled to receive light from the input waveguide, and operable to produce a first output or a second output, wherein the second output has a lower amplitude than the first output; a second electro-absorption modulator, coupled to receive light from the input waveguide, and operable to produce a third output or a fourth output, wherein the fourth output has a lower amplitude than the third output; and an output waveguide, coupled to receive light from the first electro-absorption modulator and the second electro-absorption modulator, and output a combined signal comprising an output of the first
(Continued)

electro-absorption modulator and an output of the second electro-absorption modulator.

10 Claims, 28 Drawing Sheets

Related U.S. Application Data

(60) Provisional application No. 62/473,011, filed on Mar. 17, 2017.

(51) Int. Cl.
*G02F 1/225* (2006.01)
*H04B 10/54* (2013.01)

(58) Field of Classification Search
CPC ....... G02F 2001/0155; G02F 2001/212; G02F 1/225; G02F 1/212; G02F 1/0121
USPC .......................................................... 398/188
See application file for complete search history.

(56) References Cited

U.S. PATENT DOCUMENTS

| | | | |
|---|---|---|---|
| 8,050,555 B2 | 11/2011 | McBrien | |
| 8,588,556 B1 | 11/2013 | Dong | |
| 8,879,873 B2 | 11/2014 | Goh et al. | |
| 8,989,600 B2 | 3/2015 | Nakamoto | |
| 9,843,390 B2 | 12/2017 | Liu et al. | |
| 9,851,615 B2* | 12/2017 | Jewart ...................... | G02B 6/28 |
| 9,864,254 B2 | 1/2018 | Kazmierski et al. | |
| 10,284,302 B2 | 5/2019 | Kawaai et al. | |
| 10,587,346 B2 | 3/2020 | Fujita | |
| 11,296,794 B2 | 4/2022 | Hashemi Talkhooncheh et al. | |
| 2003/0053754 A1* | 3/2003 | Doerr ................. | G02B 6/12021 385/27 |
| 2006/0263098 A1 | 11/2006 | Akiyama et al. | |
| 2007/0211984 A1* | 9/2007 | Gopinath .............. | G02F 1/3132 385/39 |
| 2007/0230617 A1 | 10/2007 | Tao et al. | |
| 2009/0097843 A1 | 4/2009 | McBrien | |
| 2009/0169148 A1 | 7/2009 | Doerr et al. | |
| 2009/0323164 A1* | 12/2009 | Miyazaki ................ | G02F 1/225 359/279 |
| 2010/0014874 A1 | 1/2010 | Kawanishi et al. | |
| 2010/0046886 A1 | 2/2010 | Doerr | |
| 2010/0060972 A1 | 3/2010 | Kucharski et al. | |
| 2010/0080571 A1 | 4/2010 | Akiyama et al. | |
| 2010/0111466 A1 | 5/2010 | Doerr et al. | |
| 2011/0158577 A1 | 6/2011 | Doerr | |
| 2012/0229886 A1 | 9/2012 | Chen et al. | |
| 2012/0308240 A1 | 12/2012 | Akiyama | |
| 2012/0315036 A1 | 12/2012 | Kucharski et al. | |
| 2012/0327961 A1 | 12/2012 | Poon et al. | |
| 2013/0108277 A1 | 5/2013 | Liu et al. | |
| 2013/0170841 A1 | 7/2013 | Liu et al. | |
| 2013/0195394 A1 | 8/2013 | Hosokawa et al. | |
| 2013/0322809 A1* | 12/2013 | Goh ................... | H04B 10/5161 385/3 |
| 2014/0133870 A1 | 5/2014 | Lee et al. | |
| 2014/0153075 A1* | 6/2014 | Malacarne .......... | H04B 10/541 359/238 |
| 2014/0153077 A1 | 6/2014 | Kawakami et al. | |
| 2015/0198859 A1 | 7/2015 | Chen | |
| 2016/0054640 A1 | 2/2016 | Khurgin et al. | |
| 2016/0218811 A1* | 7/2016 | Chen .................... | H04B 10/541 |
| 2016/0363835 A1 | 12/2016 | Nagarajan | |
| 2017/0026133 A1* | 1/2017 | Antona .................. | H04B 10/54 |
| 2017/0149503 A1 | 5/2017 | Liu et al. | |
| 2018/0034555 A1* | 2/2018 | Goh ....................... | G02B 6/122 |
| 2018/0173077 A1 | 6/2018 | Schmogrow | |
| 2018/0205465 A1 | 7/2018 | Tanaka et al. | |
| 2018/0267384 A1 | 9/2018 | Padmaraju et al. | |
| 2019/0036611 A1 | 1/2019 | Fujita | |

FOREIGN PATENT DOCUMENTS

| | | | | |
|---|---|---|---|---|
| EP | | 0933963 A2 * | 8/1999 | ......... G02B 6/12011 |
| WO | WO 2014/068197 A1 | | 5/2014 | |

OTHER PUBLICATIONS

Daunt, Chris L. M. et al., "Correction Methods for Electroabsorption Modulator-Based Phase-Shift Keying Photonic Integrated Circuits", IEEE Journal of Selected Topics in Quantum Electronics, Nov./Dec. 2013, 7 pages, vol. 19, No. 6, IEEE.

Doerr, C.R. et al., "28-Gbaud InP Square or Hexagonal 16-QAM Modulator", OSA/OFC/NFOEC, Mar. 2011, 4 pages.

Huang, W-J. et al., "Optical DAG for Generation of PAM4 Using Parallel Electro-Absorption Modulators", 42nd European Conference and Exhibition on Optical Communications, Sep. 18-22, 2016, Düsseldorf, pp. 1118-1120, VDE VERLAG GMBH.

International Search Report and Written Opinion of the International Searching Authority, Mailed Aug. 9, 2018, Corresponding to PCT/EP2018/056540, 19 pages.

Jeong, S-H. et al., "Compact optical 90° hybrid employing a tapered 2x4 MMI coupler serially connected by a 2x2 MMI coupler", Optics Express, Mar. 1, 2010, pp. 4275-4288, vol. 18, No. 5, Optical Society of America.

Neilson, D.T et al., "EAM-based InP MZ modulator for 40-Gb/s PSBT using 20-Gb/s tributaries", ECOC 2008, Brussels, Belgium, Sep. 21-25, 2008, pp. 1-2, IEEE.

Partial English translation of the Chinese Notification of the First Office Action, for Patent Application No. 201880002544.8, mailed Jan. 19, 2023, 14 pages.

U.S. Notice of Allowance from U.S. Appl. No. 16/494,675, dated Dec. 3, 2021, 10 pages.

U.S. Office Action from U.S. Appl. No. 16/494,675, dated Jun. 22, 2020, 21 pages.

U.S. Office Action from U.S. Appl. No. 16/494,675, dated May 10, 2021, 20 pages.

U.S. Office Final Action from U.S. Appl. No. 16/494,675, dated Oct. 8, 2021, 12 pages.

Verbist, J. et al., "DAC-less and DSP-free PAM-4 Transmitter at 112 Gb/s with Two Parallel GeSi Electro-Absorption Modulators", ECOC PDP, 2017, 3 pages.

\* cited by examiner

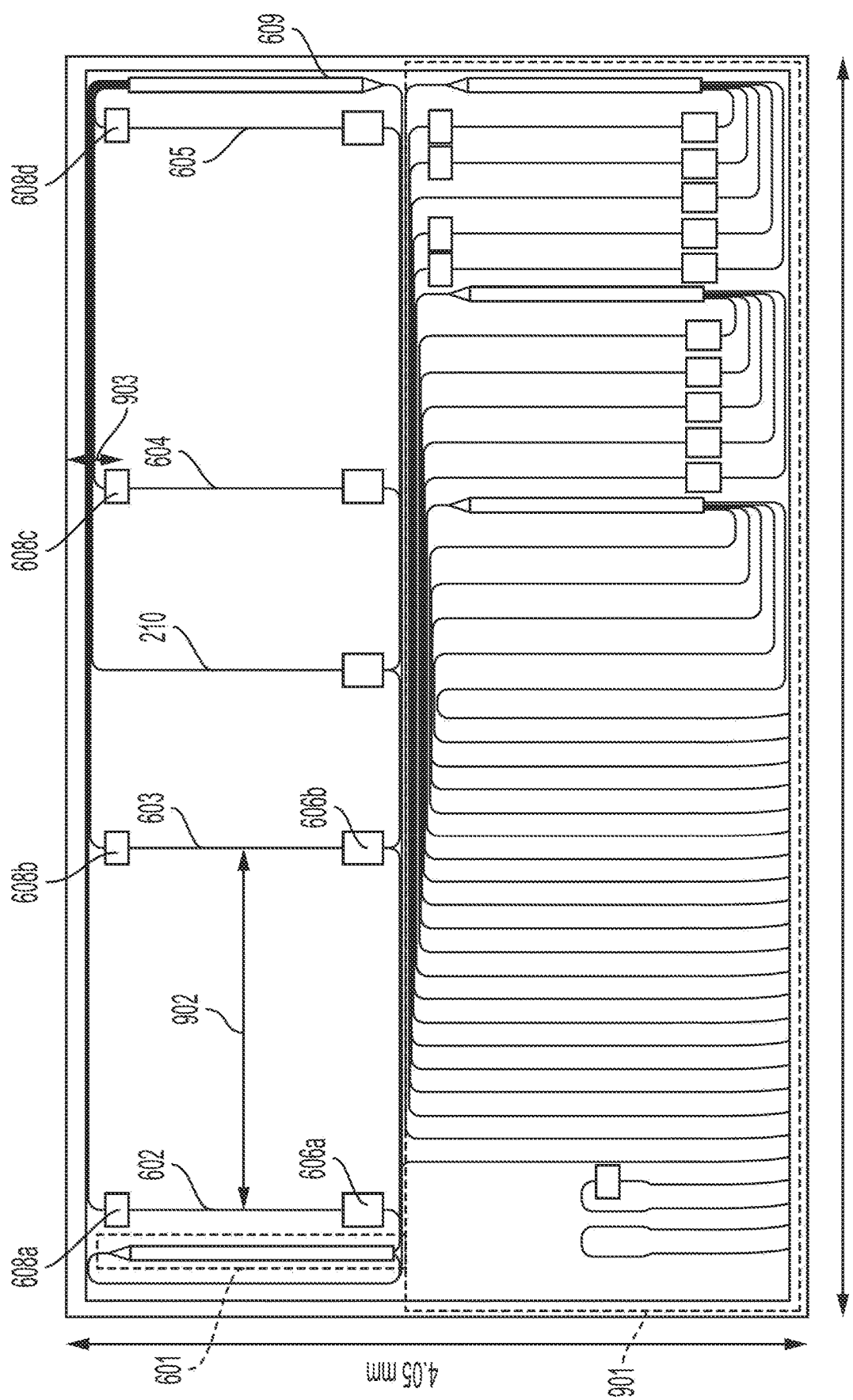

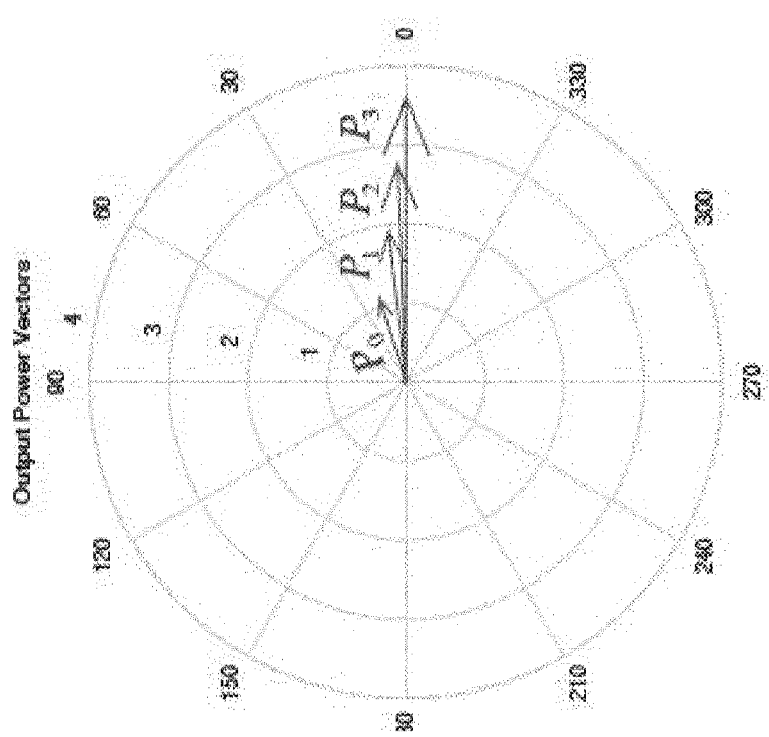
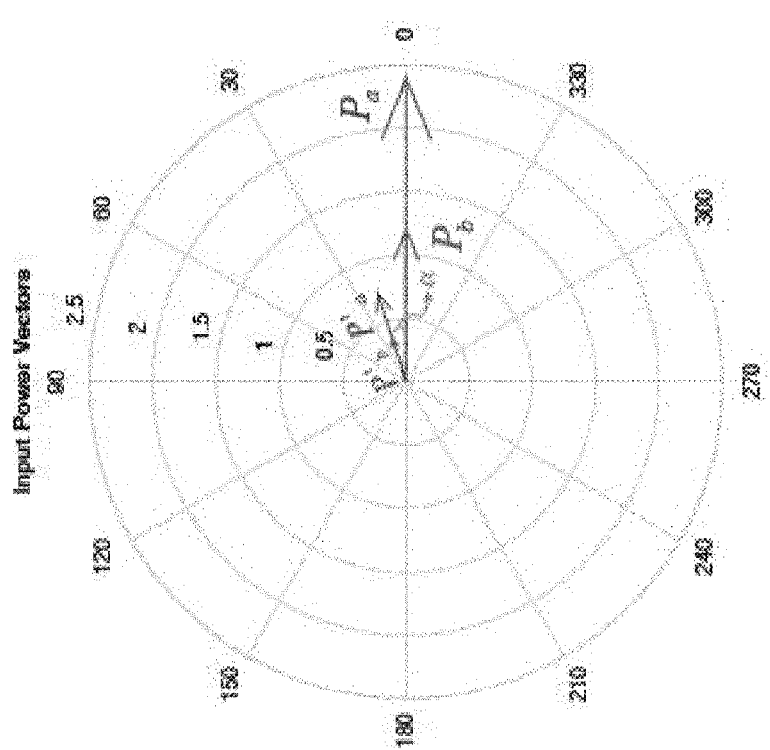
Fig. 23

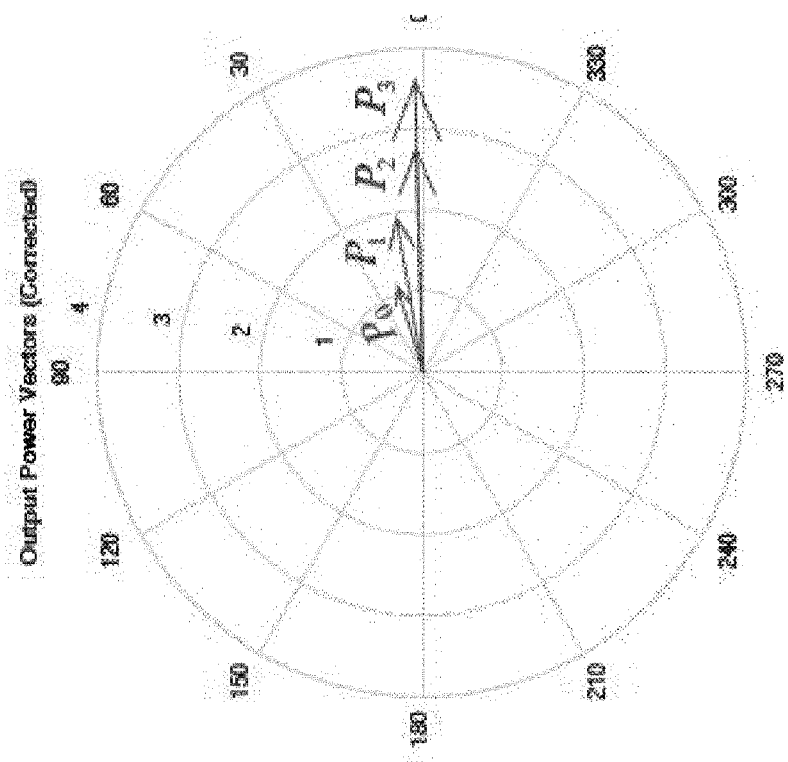
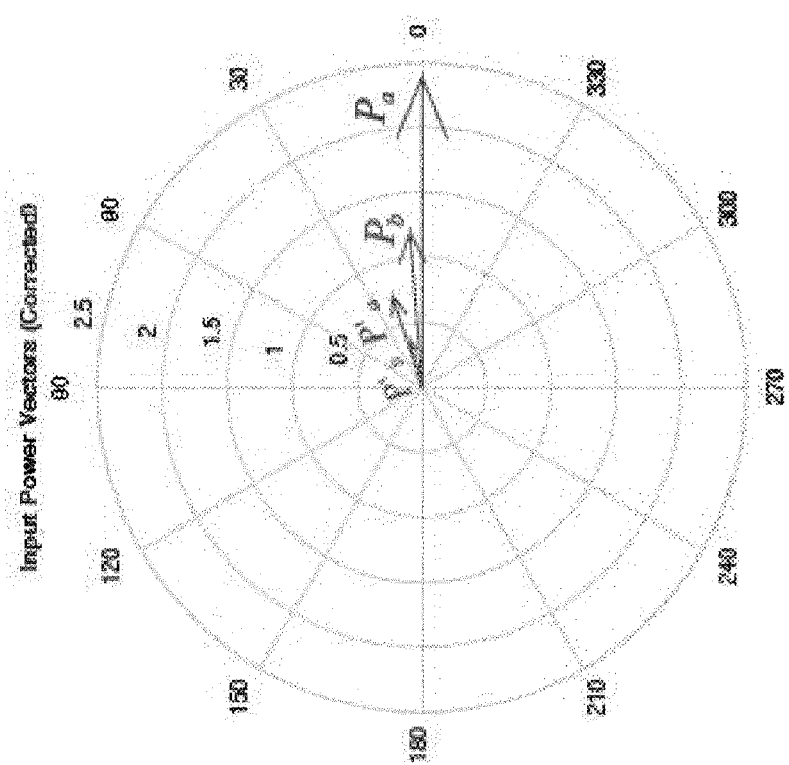
Fig. 25

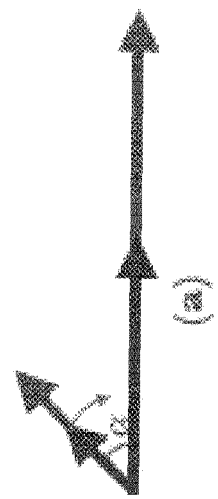
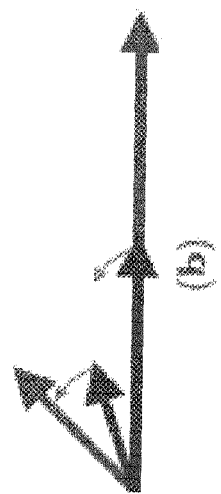
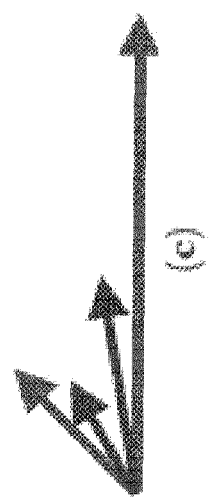
Fig. 27

OPTICAL MODULATOR AND METHOD OF USE

CROSS REFERENCE TO RELATED APPLICATIONS

The present application is a continuation-in-part of U.S. patent application Ser. No. 16/494,675, filed Sep. 16, 2019, which is a national phase application of International Application No. PCT/EP2018/056540, filed Mar. 15, 2018, which claims priority to and the benefit of U.S. Provisional Application No. 62/473,011, filed Mar. 17, 2017; the entire contents of all of the documents identified in this paragraph are incorporated herein by reference.

FIELD

Embodiments of the present invention relate to optoelectronic devices, and particularly to optoelectronic devices for quadrature-amplitude modulation and a method of modulating an optical signal in accordance with a quadrature-amplitude modulation scheme.

BACKGROUND

Quadrature-amplitude modulation (QAM) is a candidate modulation format for future optical interconnect modules, and may achieve 200 Gb/s per wavelength. This can be particularly suitable for inter-datacentre applications. In this modulation scheme, the information is encoded in the amplitude and the phase of the optical signal. In QAM-16, there are 16 points available in the in-phase-quadrature-phase complex plane. The points 101 are generally equally spaced, as shown in FIG. 1. Four specific bits can be associated to each symbol/point. The constellation size is chosen arbitrarily.

A series of pulses each with the characteristics of one of the 16 constellation points, representing four specific bits, can be sent to communicate information. According to different applications, the spacing, relative orientation, and the position of the centre point 102, would be subject to change.

Conventionally, optical QAM schemes are achieved by using a nested Mach-Zehnder in-phase modulators (MZ IQ modulators). In these configurations, a cascade of Y-junctions or 3-dB couplers are used to split or combine the light. A disadvantage to such configurations is the inherent 3-dB loss each time two optical branches are combined. In addition, increasing the number of couplers will result in an increase in the total optical loss which can be significant. This is because each 3-dB coupler has a certain insertion loss (typical compact structures have around 0.1 dB of insertion loss).

The use of ring resonator modulations has also been demonstrated in implementing a QAM-16 modulation scheme. However, they have a low practicality for a commercial product due to their high sensitivity to environmental conditions and fabrication tolerances. They would therefore require power intensive stabilization circuits.

There is a desire to provide a device suitable for QAM-16 modulation which does not suffer the above drawbacks.

Pulse-amplitude modulation (PAM) is a modulation format selected by an IEEE standards committee for achieving 50 Gb/s per lambda for next generation optical interconnects, where information comprising a message is encoded in the amplitude of a series of pulses comprising the signal. In PAM-4 modulation, $2^2$ (=4) discrete pulse amplitudes are available, which are generally equally spaced in the linear regime as shown in FIG. 11.

$1^{st}$ Summary

Accordingly, in a first aspect embodiments of the invention provide an optoelectronic device for quadrature-amplitude modulation (QAM), comprising:
an input waveguide;
two intermediate waveguides, each coupled to the input waveguide via an input coupler; and
an output waveguide, coupled to each of the intermediate waveguides via an output coupler;
wherein each intermediate waveguide includes a modulating component connected in series with a phase shifting component, and each modulating component is connected to a respective electronic driver, the electronic drivers together being operable to produce a QAM-N modulated output from light entering the device from the input waveguide.

Such a device enables QAM-N, and preferably QAM-16, modulation in a compact (high integration density) transmitter. The device also requires a lower power consumption as compared to conventional devices, and the driver signals can be simpler. In some examples, the electronic drivers provide identical driver signals to each of the modulating components. There is no requirement for a digital-to-analogue-converter (DAC) in a device as per embodiments of the present invention. Therefore, in some embodiments, there is no DAC provided in the device. By electronic driver, it may be meant that the electronic driver is an electronic driver chip.

By modulating component, it may be meant each intermediate waveguide includes either: a phase modulator, an amplitude modulator, or a phase modulator and an amplitude modulator. The electronic drivers may be operable to produce a QAM-16 modulated output.

Optional features of embodiments of the invention will now be set out. These are applicable singly or in any combination with any aspect of embodiments of the invention.

The phase shifting component within each intermediate waveguide may be a DC phase shifter. By DC phase shifter, it may be meant that a component provides a specific static phase shift that does not need to be changed frequently and significantly (i.e. does not need to be modulated, and should generally be regulated to a certain value).

Each electronic driver may be a PAM-4 electronic driver, such that the respective modulating component can operate in four modulation states. One of these modulation states may be where the modulating component does not alter the properties of the light passing therethrough, i.e. the characteristics of the light are not actively modified. However, for clarity, it is referred to as one of the four modulation states that may be provided.

The input coupler may be configured to equally split input light between the two intermediate waveguides. In this example, the modulating component may be an amplitude modulator. For example, the modulating component may be an electro-absorption modulator. Alternatively, the modulating component may be a ring modulator, or an amplitude modulating using polarization modulators.

The device may further comprise a DC phase shifting intermediate waveguide, coupled to the input waveguide and the output waveguide via the respective couplers, the DC phase shifting intermediate waveguide being configured to re-centre a constellation corresponding to the QAM-N outputs available from the device. This DC phase shifting intermediate waveguide may contain, asides from the waveguide itself, only a DC phase shifter. With the introduction of this intermediate waveguide, the light may be split between the two intermediate waveguides and the DC phase shifting waveguide at a ratio of 1:x:1, such that the power is split equally between the two intermediate waveguides and some fraction x is provided to the DC phase shifting waveguide. The value of x may be defined by the characteristics of the modulating components within the two intermediate waveguides. Since the characteristics of the modulator (i.e. extinction ratio, chirp and insertion loss for an EAM, or insertion loss in a phase modulator) will define the exact shape of the constellation diagram (e.g. size, shift from origin, and relative rotation), the power portion "x" in the extra arm should be such that it brings back the centre point of the constellation to the origin.

In further detail, if each intermediate waveguide is considered to have a representative vector in the IQ plane (see, e.g. FIG. 1) the vector corresponding to the DC phase shifter intermediate waveguide should have an amplitude proportional to the distance of the centre of the constellation to the origin, and a phase of 180° away from the phase of the centre-point vector, so that when it is combined with the vectors of the two intermediate waveguides it brings the centre point of the constellation back to the origin (0,0).

A static relative phase difference between the two intermediate waveguides may be set at 90°. This static relative phase difference may be set by the phase shifting component (e.g. DC phase shifter) within each intermediate waveguide.

The input coupler may be configured to split input light between the two intermediate waveguides at a ratio of 2:1 such that one of the waveguides receives twice the optical power of the other. In this example, the modulating component may be a phase modulator. For example, the phase modulator may be a heater, a pn junction, a p-i-n phase modulator, or a metal-oxide-semiconductor (MOS) based phase modulator. In this example, a static phase difference between the two intermediate waveguides may be set to 0°.

The two intermediate waveguides may be first and second intermediate waveguides, and the device may further comprise a third intermediate waveguide and a fourth intermediate waveguide, each coupled to the input waveguide via the input coupler and coupled to the output waveguide via the output coupler. The third and fourth intermediate waveguides may each include a modulating component connected in series with a phase shifting component and each modulating component may be connected to an electronic driver, the electronic drivers of each of the first and second intermediate waveguides and third and fourth intermediate waveguides may be operable to produce a QAM-N modulated output from light entering the device from the input waveguide. The phase shifting component within the third and fourth intermediate waveguides may be a DC phase shifter. Each driver may be a binary non-return-to-zero driver, such that the respective modulating component can be operated in two modulation states. The input coupler may be configured to split input light between the intermediate waveguides at a ratio of 2:1:2:1, such that two of the waveguides receive twice the optical power of the other two. Where a DC phase shifting intermediate waveguide is also present, the input light may be split at a ratio of 2:1:x:2:1, where x is the amount provided to the DC phase shifting intermediate waveguide and defined by the modulation components characteristics. A static phase difference between the first intermediate waveguide and the second intermediate waveguide may be 180°, and a static phase difference between the third intermediate waveguide and the fourth intermediate waveguide may be 180°. A static phase difference between the first intermediate waveguide and the third intermediate waveguide may be 90°, and a static phase difference between the second intermediate waveguide and the fourth intermediate waveguide may be 90°. Each modulating component may be a phase modulator (for example those discussed above), or each modulating component may be an amplitude modulator (for example those discussed above). The modulating components in all of the first to fourth intermediate waveguides may have substantially identical characteristics. For example, if the modulating components are all electro-absorption modulators they may all have the same length.

Where the device includes first, second, third, and fourth intermediate waveguides and also includes a DC phase shifting intermediate waveguide, the light may be split between the five intermediate waveguides at a ratio of 2:1:x:2:1 where 'x' is (as above) defined by the modulators characteristics.

Each intermediate waveguide may include two modulating components connected in series: a phase modulator; and an amplitude modulator.

Either or both of the input coupler and the output coupler may comprise at least one phase correcting channel, said phase correcting channel having a width, as measured in a direction perpendicular to a guiding direction of the channel, which varies along a direction parallel to the guiding direction of the channel. By channel, it may be meant that a path exists for an optical signal passing through the coupler. For example, if the coupler is a 1×5 coupler, it may comprise at least 5 channels at the output of the coupler.

In all examples of the embodiments of invention, the modulating components within each of the intermediate waveguides may have the same modulating characteristics. For example, where the modulating component is an electro-absorption modulator, the electro-absorption modulators present in each of the intermediate waveguides should have the same length and other characteristics that affect their modulation.

In a second aspect, the embodiments of invention provide a method of modulating an optical signal according to a quadrature-amplitude modulation (QAM) scheme, comprising:
  providing an optical signal at an input waveguide;
  splitting the optical signal into two intermediate waveguides, each coupled to the input waveguide via an input coupler;
  modulating the amplitude and phase of the optical signal present in each of the intermediate waveguides, according to a QAM scheme and by respective modulating components connected in series with respective phase shifting components, said modulating components being respectively connected to and driven by an electronic driver; and
  recombining the optical signal into an output waveguide, coupled to each of the intermediate waveguides via an output coupler, wherein the recombined optical signal.

Optional features of embodiments of the invention will now be set out. These are applicable singly or in any combination with any aspect of embodiments of the invention.

The phase shifting component may be a DC phase shifter.

Each modulating component may be driven by a PAM-4 electronic driver so as to be operable in four modulation states.

The input coupler may equally split the optical signal between the two intermediate waveguides. The modulating component may be an amplitude modulator, for example an electro-absorption modulator, and may modulate the amplitude of the optical signal.

A DC phase shifting intermediate waveguide may be coupled to the input waveguide and the output waveguide via the respective couplers, and may re-centre a constellation corresponding to the QAM-N outputs.

A static phase difference between the two intermediate waveguides may be set at 90°.

The input coupler may split the optical signal between the two intermediate waveguides at a ratio of 2:1, such that one of the waveguides receives twice the optical power of the other. The modulating component may be a phase modulator. A static phase difference between the two intermediate waveguides may be set at 0°.

The two intermediate waveguides may be first and second intermediate waveguides, and the optical signal may be split between the first and second intermediate waveguide and also a third and fourth intermediate waveguide, the third and fourth intermediate waveguides may each be coupled to the input waveguide via the input coupler and coupled to the output waveguide via the output coupler. The amplitude and phase of the optical signal present in each of the intermediate waveguides may be modulated according to a QAM scheme by respective modulating components connected in series with respective phase shifting components. The phase shifting components may be DC phase shifters. Each modulating component may be driven by a non-return-to-zero electronic driver so as to be operable in two modulating states. The input coupler may split the optical signal between the intermediate waveguides at a ratio of 2:1:2:1, such that two of the waveguides receive twice the optical power of the other two. A static phase difference between the first intermediate waveguide and the second intermediate waveguide may be 180° and a static phase difference between the third intermediate waveguide and the fourth intermediate waveguide may be 180°. A static phase difference between the first intermediate waveguide and the third intermediate waveguide may be 90°, and a static phase difference between the second intermediate waveguide and the fourth intermediate waveguide may be 90°. Each modulating component may be a phase modulator, or each modulating component may be an amplitude modulator.

Each intermediate waveguide may include two modulating components connected in series: a phase modulating component; and an amplitude modulating component. Each modulating component may be driven by a non-return-to-zero electronic driver.

Either or both of the input coupler and the output coupler may comprise at least one phase correcting channel, said phase correcting channel having a width, as measured in a direction perpendicular to a guiding direction of the channel, which varies along a direction parallel to the guiding direction of the channel. By channel, it may be meant that a path exists for an optical signal passing through the coupler. For example, if the coupler is a 1×5 coupler, it may comprise at least 5 channels at the output of the coupler.

The method may be performed on an optoelectronic device according to the first aspect.

Aspects and embodiments of the present invention will now be discussed with reference to the accompanying figures. Further aspects and embodiments will be apparent to those skilled in the art. All documents mentioned in this text are incorporated herein by reference 2$^{nd}$ Summary Accordingly, in a first aspect, embodiments of the invention provide an optical device, operable to provide a PAM-N modulated output, comprising:
an input waveguide, configured to receive light;
a first electro-absorption modulator, coupled to receive light from the input waveguide, and operable to produce a first output or a second output, wherein the second output has a lower amplitude than the first output;
a second electro-absorption modulator, coupled to receive light from the input waveguide, and operable to produce a third output or a fourth output, wherein the fourth output has a lower amplitude than the third output; and
an output waveguide, coupled to receive light from the first electro-absorption modulator and the second electro-absorption modulator, and output a combined signal comprising an output of the first electro-absorption modulator and an output of the second electro-absorption modulator;
wherein the first electro-absorption modulator and the second electro-absorption modulator are disposed in parallel.

In a second aspect, embodiments of the invention provide a Mach-Zehnder interferometer, comprising:
an input waveguide;
an output waveguide;
a first arm, optically connecting the input waveguide and the output waveguide;
a second arm, optically connecting the input waveguide and the output waveguide, the second arm being disposed in parallel with the first arm; and
at least two electro-absorption modulators, disposed respectively in the first arm and the second arm, and operable to provide PAM-N modulation.

Optional features of embodiments of the invention will now be set out. These are applicable singly or in any combination with any aspect of embodiments of the invention.

The optical device may further comprise:
a variable input coupler, disposed between the input waveguide and both of the first electro-absorption modulator and the second electro-absorption modulator.

The input coupler may be configured to modify the light transmitted to the first electro-absorption modulator and the second electro-absorption modulator such that adjacent PAM-N modulated outputs generated by the device are linearly spaced. The input coupler may be configured to unequally split input light between the first electro-absorption modulator and the second electro-absorption modulator. The input coupler may be a Mach-Zehnder interferometer, comprising an input coupler coupled to the input waveguide, two parallel arms and an output coupler. At least one of the parallel arms may include a phase-shifter.

Disposed between the output waveguide and the first electro-absorption modulator and the second electro-absorption modulator may be a variable output coupler. The output coupler may be configured to modify the received light from the first electro-absorption modulator and the second electro-absorption modulator such that adjacent PAM-N modulated outputs are linearly spaced. The output power of light which can be outputted by the coupler may be described by:

$$P_{OUT} = \left| \sqrt{(1-k)P_{in1}}\, e^{j\theta_1} + \sqrt{(k)P_{in2}}\, e^{j\theta_2} \right|^2$$

where $P_{OUT}$ is the output power, k is a coupling coefficient $P_{in1}$ is the input power from the first electro-absorption modulator, $\theta_1$ is the phase of light entering the coupler from the first electro-absorption modulator, $P_{in2}$ is the input power from the second electro-absorption modulator, and $\theta_2$ is the phase of light entering the coupler from the second electro-absorption modulator. k may be less than 0.44. The variable output coupler may a Mach-Zehnder interferometer, comprising an input coupler coupled to the first electro-absorption modulator and the second electro-absorption modulator, two parallel arms and an output coupler coupled to the output waveguide. At least one of the parallel arms may include a phase-shifter.

The optical device may further comprise:
- a first analogue driver, said first driver configured to provide a first driver signal to the first electro-absorption modulator; and
- a second analogue driver, said second driver configured to provide a second driver signal to the second electro-absorption modulator;
- wherein, when driven by the respective driver signal, the first electro-absorption modulator produces the second output and the second electro-absorption modulator produces the fourth output. The first driver signal and the second driver signal are identical.

The two analogue drivers may be two driver circuits occupying a single driver chip. The drivers may independently provide voltages $V_1$ and $V_2$, which may have the same value or different values. $V_1$ and $V_2$ may both equal 2V. By using this configuration, it is possible to implement the conversion of a 2-bit symbol into 4 analogue optical states without the use of a digital-to-analogue-converter. One of the drivers can correspond to the least-significant bit, and the other may correspond to the most-significant bit.

The optical device may include a Mach-Zehnder interferometer, and the first electro-absorption modulator is disposed within a first arm of the Mach-Zehnder interferometer and the second electro-absorption modulator is disposed within a second arm of the Mach-Zehnder interferometer.

The device may include a phase-shifter associated with at least one of the electro-absorption modulators, said phase-shifter being operable to modify a phase shift associated with the respective electro-absorption modulator. The phase-shifter may be disposed within an arm of the Mach-Zehnder interferometer. The phase-shifter may be any one or more of: a heater; a PIN phase shifter; or a PN phase shifter.

The device may include a directional coupler coupled to the output waveguide, configured to redirect a portion of the output power for use to bias and stabilize the phase shifter. The portion of the output power may be less than 5%.

According to an embodiment of the present disclosure, there is provided an optoelectronic device for modulation, including: an input waveguide; a first intermediate waveguide and a second intermediate waveguide, each coupled to the input waveguide via an input coupler; and an output waveguide, coupled to each of the intermediate waveguides via an output coupler, wherein each intermediate waveguide includes a modulating component connected in series with a phase shifting component, and each modulating component is connected to a respective electronic driver, the electronic drivers together being operable to produce a modulated output from light entering the optoelectronic device from the input waveguide, and wherein: the input coupler is a variable input coupler; the output coupler is a variable output coupler; or the input coupler is a variable input coupler and the output coupler is a variable output coupler.

BRIEF DESCRIPTION OF THE DRAWINGS

Embodiments of the invention will now be described by way of example with reference to the accompanying drawings in which:
FIG. 9 shows a top-down plan view of a chip layout including a device for QAM-16 modulation;
FIG. 23 shows a diagram of input power vectors and a diagram of output power vectors;
FIG. 25 shows a diagram of input power vectors and a diagram of output power vectors;
FIG. 27 shows three vector diagrams.

DETAILED DESCRIPTION AND FURTHER OPTIONAL FEATURES

Figure 1:
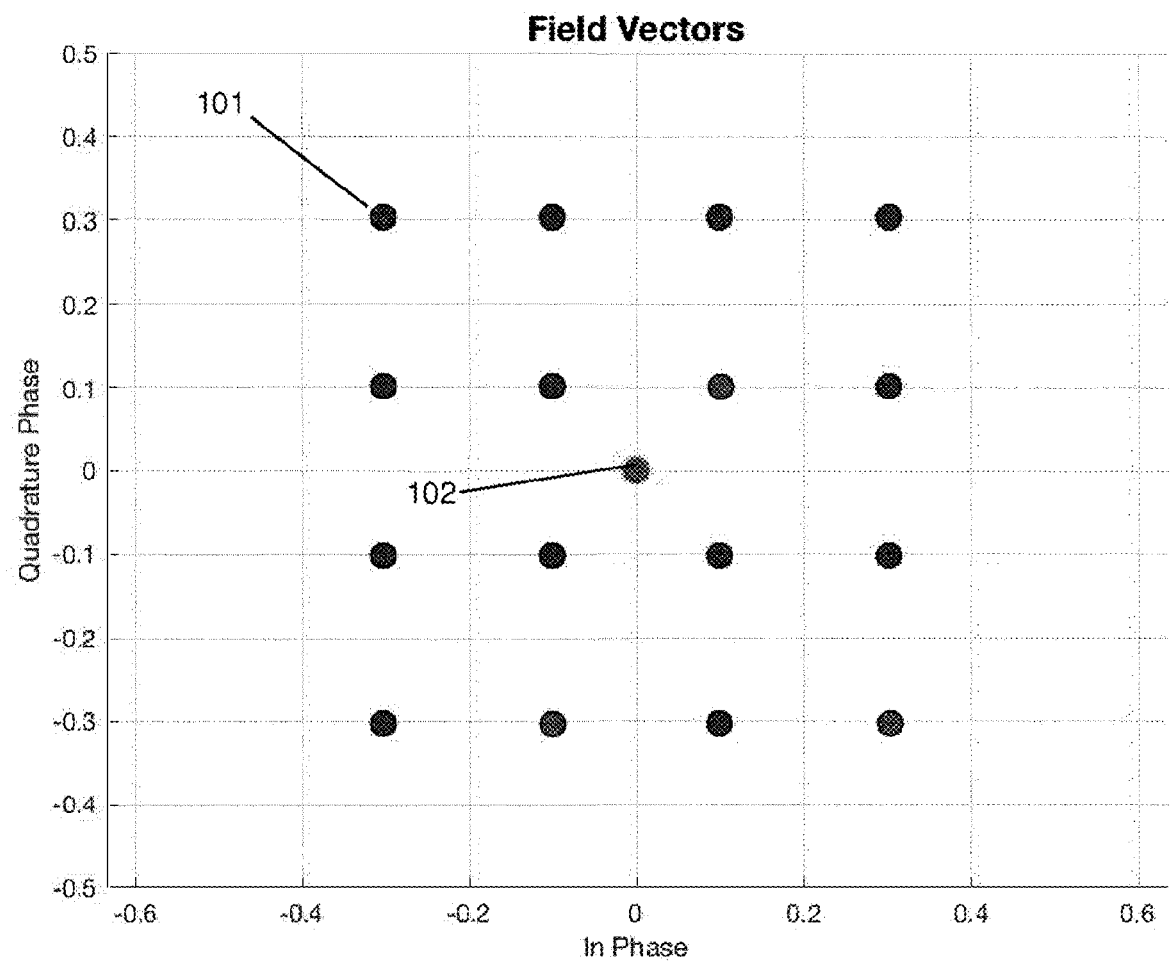
FIG. 1 shows a constellation diagram illustrating QAM-16 modulation.
Figure 2A:
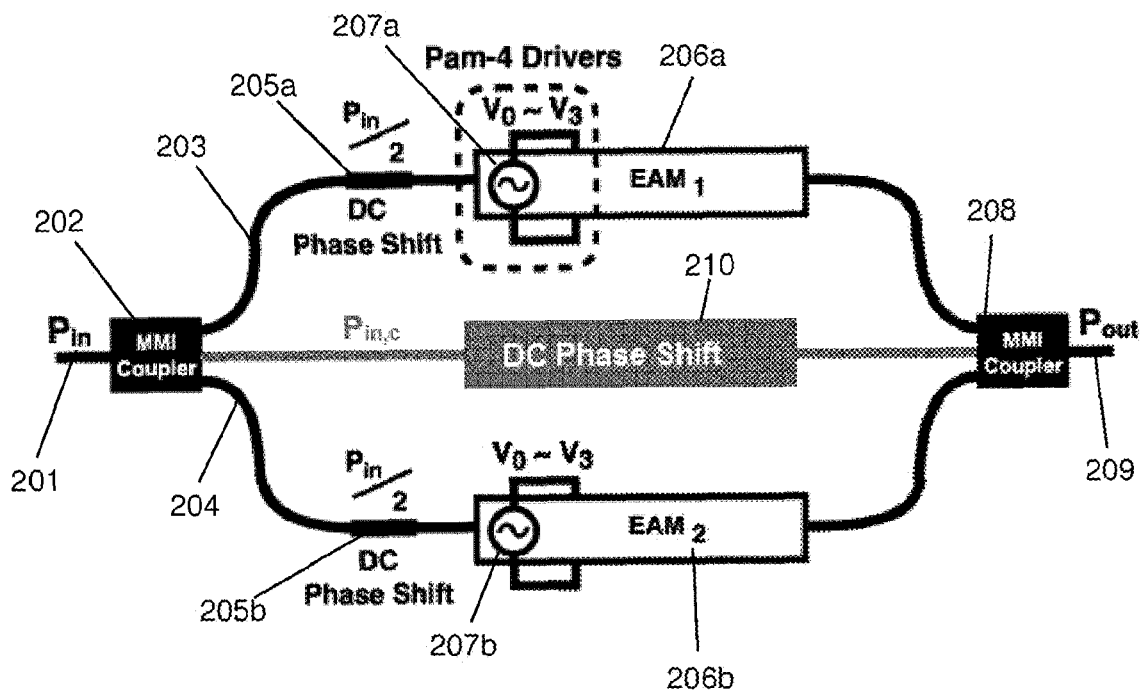
FIG. 2A shows a device for QAM-16 modulation.

FIG. 2A shows a schematic view of an optoelectronic device according to some embodiments of the present invention. An input waveguide 201, provides an optical signal with power $P_{in}$ to an input multi-mode interference coupler 202. The optical signal is split by the coupler into a first intermediate waveguide 203 and a second intermediate waveguide 204. The coupler is configured to split the optical signal at a ratio of 1:1 between the waveguides, and so each receives an optical signal with a power of $P_{in}/2$.

The first intermediate waveguide 203 includes, disposed along its optical path, a DC phase shifter 205a and an electro-absorption modulator 206a. The DC phase shifter is operated to apply a static phase shift to the optical signal as it is transmitted through the intermediate waveguide. The DC phase shifter may be implemented as a heater, a p-i-n junction, or a pn junction. The electro-absorption modulator 206a is driven by a PAM-4 driver 207a able to provide four operating voltages: $V_0$ to $V_3$. Each of these operating voltages corresponds to a modulating state of the electro-absorption modulator. In this way, the electro-absorption modulator 206a can be considered to provide a PAM-4 modulated output from the optical signal provided into the intermediate waveguide. In a 66 μm long elector-absorption modulator operating at a wavelength of 1543 nm, $V_0$ to $V_3$ may take values of: 0V, 0.4V, 1V, and 2V. These voltages may provide 4 equally spaced field outputs (and not intensity outputs). It should be noted that the voltages may not be equally spaced due to the non-linear behaviour of the EAM in this example.

Similarly, the second intermediate waveguide 204 includes, disposed along its optical path, a DC phase shifter 205b and an electro-absorption modulator 206b. The DC phase shifter is operated to apply a phase shift to the optical signal as it is transmitted through the intermediate waveguide. As with the previous electro-absorption modulator, this modulator 206b is also driven by a PAM-4 driver 207b able to provide four operating voltages: $V_0$ to $V_3$. Each of these operating voltages corresponds to a modulating state of the electro-absorption modulator. Both modulators may operable using the Franz-Keldysh effect, or the Quantum-confined Stark effect if the modulators contain quantum wells. In this way, the electro-absorption modulator 206b can be considered to provide a PAM-4 modulated output from the optical signal provided into the intermediate waveguide. The modulators may be silicon germanium based electro-absorption modulators.

An output multi-mode interference coupler 208 is connected to both the first and second intermediate waveguides. This coupler 208 recombines the optical signals transmitted through each intermediate waveguide, and provides an output signal with power $P_{out}$. As the optical signals provided by each intermediate waveguide are different (or can be different) in phase, the output signal can be modulated according to a QAM-16 scheme. The output coupler 208 is connected to an output waveguide 209, which allows the modulated signal to exit the device. Coupled between the input coupler 202 and the output coupler 202 is a DC phase shifter 210. This DC phase shifter 210 may be contained within a DC phase shifting intermediate waveguide, and may be used to bring the centre point of a constellation corresponding to the outputs of the device to the origin.

Figure 2B:
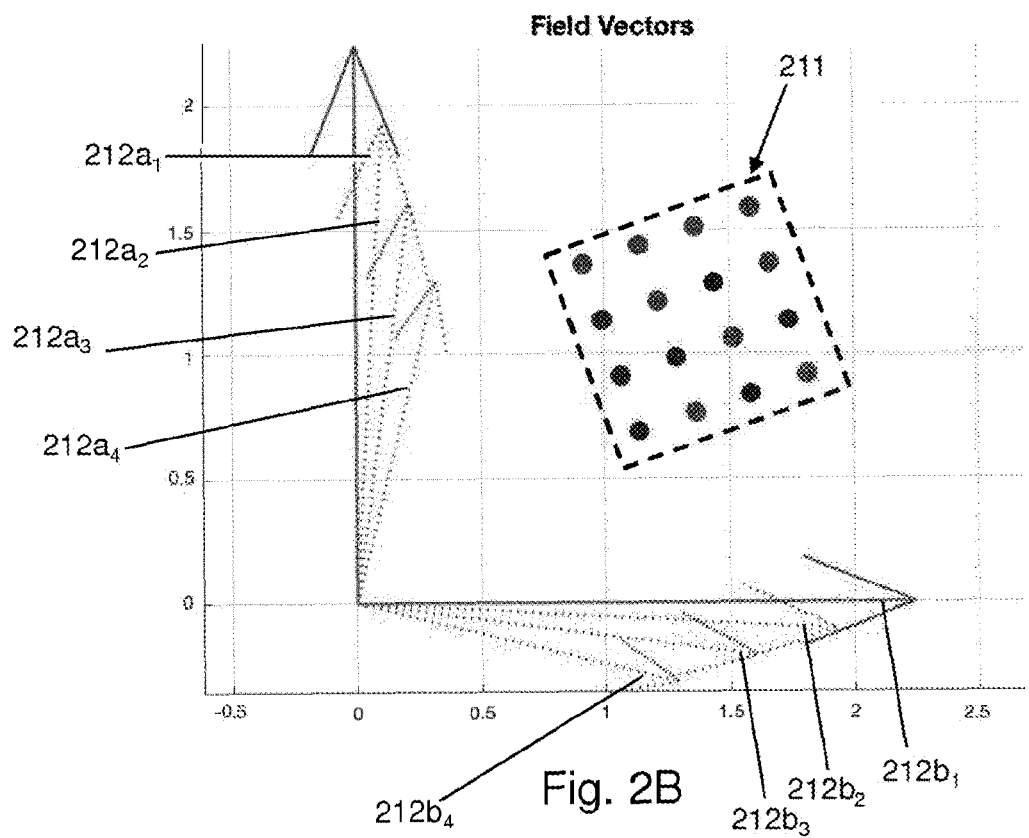
FIG. 2B shows a constellation diagram for the device in FIG. 2A.

A constellation diagram, showing the possible outputs, is shown in FIG. 2B. Sixteen points, shown in area 211, are available for transmitting information, and can be utilized by the combination of the optical signal modulated in each intermediate waveguide. Four possible modulation states are available from the modulator 206a in the first intermediate waveguide: $212a_1$, $212a_2$, $212a_3$, and $212a_4$. Modulation state $212a_1$ is achieved by not actively modulating the light passing through the amplitude modulator 206a. The remaining modulation states are achieved by applying increasing degrees of amplitude modulation. In this example, the four modulation states vary in amplitude and phase. The variation in phase is caused by the chirp of the modulator, and leads to the sixteen points in area 211 being arranged in an array which has been rotated. Similarly, four available modulation states are available from the modulator 206b: $212b_1$, $212b_2$, $212b_3$, and $212b_4$. Again, modulation state $212b_1$ is achieved by not actively modulating the light passing through the amplitude modulator 206b. The remaining modulation states are achieved by applying increasing degrees of amplitude modulation. It should be noted that in this example the modulators 206a and 206b are identical with respect to their modulating characteristics, e.g. length, extinction ratio, and chirp (i.e. an unintentional change in phase caused by the amplitude modulator).

Figure 3A:
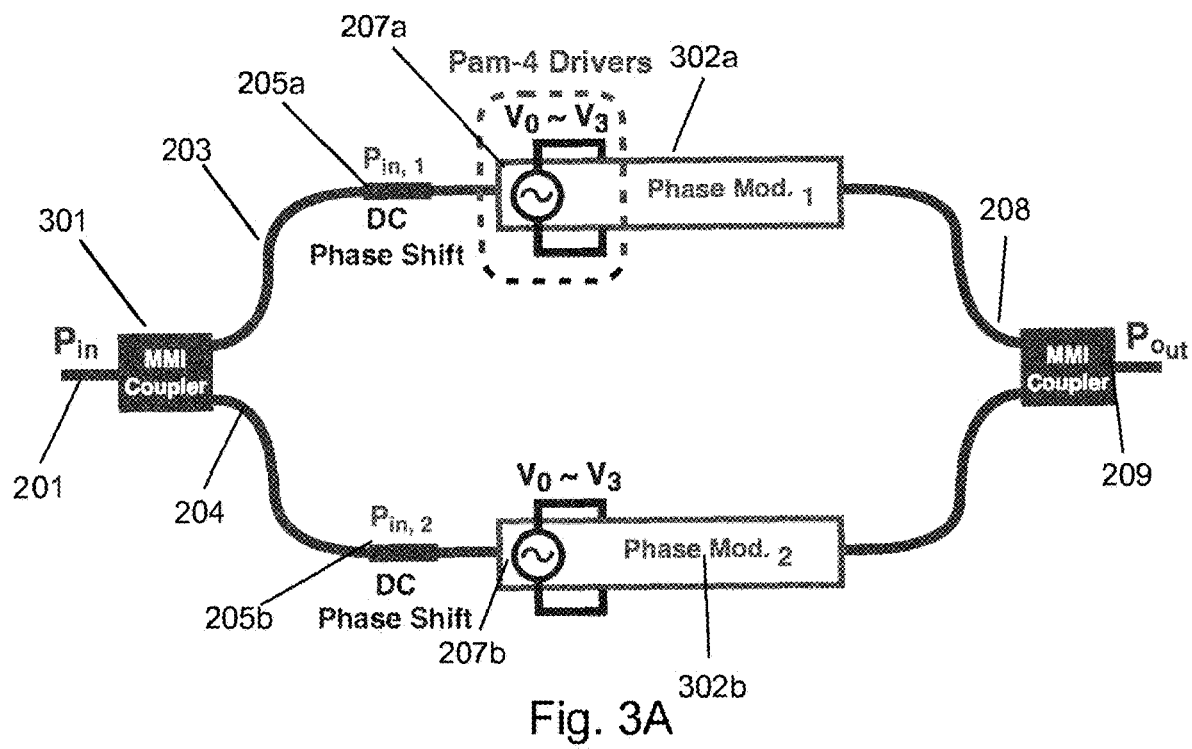
FIG. 3A shows a variant device for QAM-16 modulation.

FIG. 3A shows a variant optoelectronic device according to an embodiment of the invention. It shares a number of features with the device shown in FIG. 2A, and so like reference numerals are used for like features. A notable difference between this device and that shown in FIG. 2A, is that the modulating components 301a and 301b here are phase modulators. The phase modulators may operate by the Pockels effect. A further difference is that the optical signal is not split at a ratio of 1:1 as in the previous device. Instead, the input coupler 301 splits the optical signal at a ratio of 2:1 between the first and second intermediate waveguides. Therefore the first intermediate waveguide receives an optical signal with power $P_{in,1}$ and the second intermediate waveguide receives an optical signal with power $P_{in,2}$. The static relative phase difference in this example should be set to 0°.

Figure 3B:
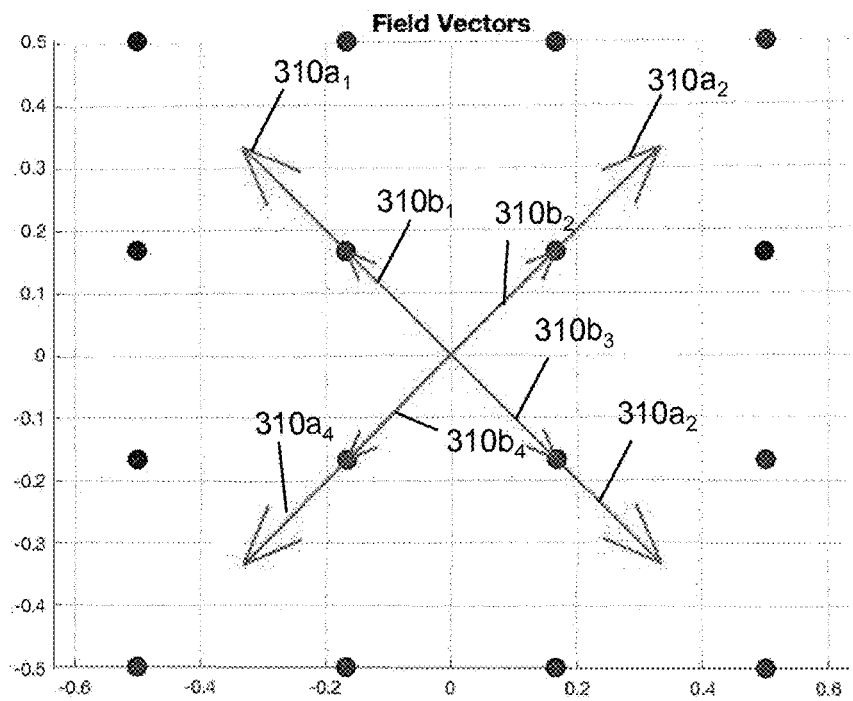
FIG. 3B shows a constellation diagram for the device in FIG. 3A.

Again, the phase modulators 301a and 301b are driven by respective PAM-4 drivers 207a and 207b such that each is operable in four modulating states. As shown in FIG. 3B, the modulation states $310b_1$-$310b_4$ indicate the states which may be provided by whichever of the intermediate waveguides that received an optical signal with the lowest power. Modulation states $310a_1$-$310a_4$ may be provided by whichever of the intermediate waveguides that received an optical signal with the highest power. Each of the sixteen points of the constellation diagram can be used by a set combination of outputs from the first and second intermediate waveguide. It should be noted that, in this example, the centre point of the constellation should remain at the origin regardless of non-idealities in the modulators, drivers, or couplers, and therefore it should not be necessary to include a DC phase shifting intermediate waveguide.

Figure 4A:
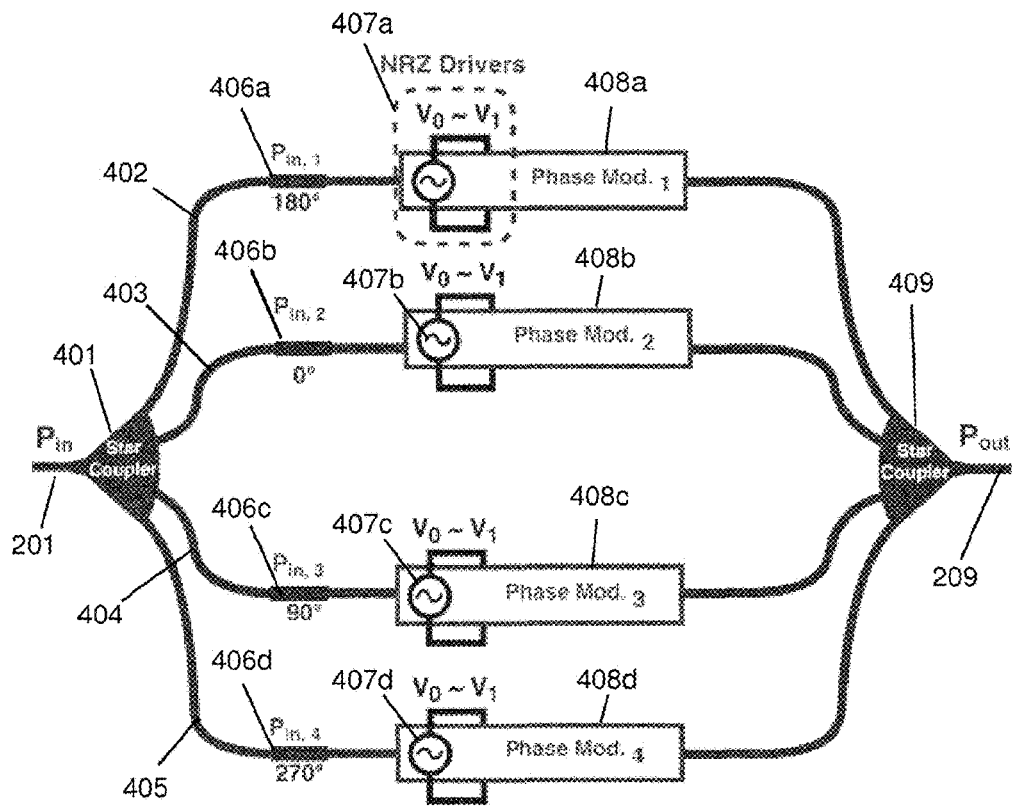
FIG. 4A shows a variant device for QAM-16 modulation.

FIG. 4A shows a further variant device according to some embodiments of the present invention. Here, the input waveguide 201 is connected to a 1×4 star coupler 401. It should be noted that the star coupler could be replaced by a multi-mode interference coupler, which is configured to produce a 1:2:1:2 splitting or coupling ratio. The star coupler 401 splits the incoming optical signal between four intermediate waveguides: first intermediate waveguide 402; second intermediate waveguide 403; third intermediate waveguide 404; and fourth intermediate waveguide 405. Each of the intermediate waveguides includes a DC phase shifter as per previous examples. However, in this instance, phase modulators 406a-406d are connected to non-return-to-zero drivers 407a-407b which are substantially identical. Therefore each modulator is operable in two modulating states, and can modulate the phase of the light passing therethrough between either 0° or 180°.

The star coupler 401 splits or couples the incoming optical signal between the four intermediate waveguides according to the ratio: 1:2:2:1, such that the second 403 and third 404 intermediate waveguides each receive twice the optical power as compared to the signal received by the first 402 and fourth 405 intermediate waveguides. A static relative phase difference between the intermediate waveguides should be set as: 180°, 0°, 90°, and 270° such that the first and second intermediate waveguide are separated by 180° of phase and the third and fourth intermediate waveguides are separated by 180° of phase. However the first and third intermediate waveguides are separated by 90° of phase, and the second and fourth intermediate waveguides are also separated by 90° of phase.

Figure 4B:
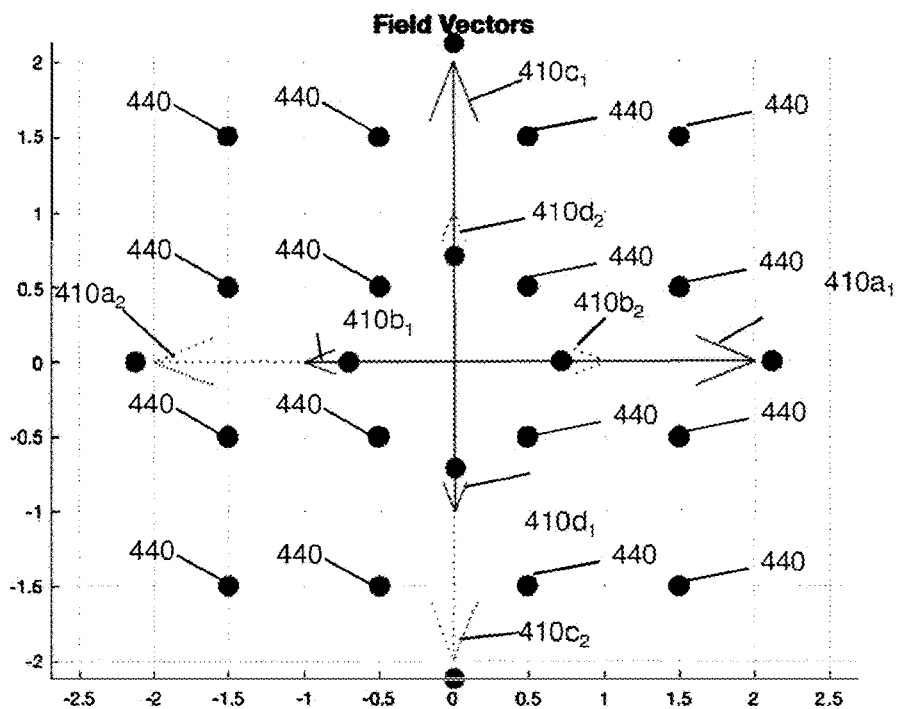
FIG. 4B shows a constellation diagram for the device in FIG. 4A.

A device as shown in FIG. 4A is able to produce the modulation states 440 shown in FIG. 4B. These are obtained by combining the modulation states of each of the four intermediate waveguides. The first intermediate waveguide 402, provides modulation states $410b_1$ and $410b_2$ which are generally the same in magnitude but with a 180° phase change. The second intermediate waveguide 403 provides modulation states $410a_1$ and $410a_2$ which are, again, generally the same in magnitude but with a 180° phase change. The third intermediate waveguide 404 provides modulation states $410c_1$ and $410c_2$, and the fourth intermediate waveguide 405 provides modulation states $410d_1$ and $410d_2$.

The centre point of the constellation, as shown in FIG. 4B, should remain at the origin when using the device shown in FIG. 4A. However, non-idealities in the phase modulator characteristics, electronic drivers, or the input/output couplers will result in a shift of the centre point and an additional intermediate waveguide may be necessary to bring the centre point of the constellation back to the centre (as has been discussed previously). In this case, the power and the phase of the additional intermediate waveguide would need to be adjusted accordingly and the input/output couplers would need to be modified to a 1×5 configuration with a corresponding adjustment to the splitting/coupling ratio.

Figure 5:
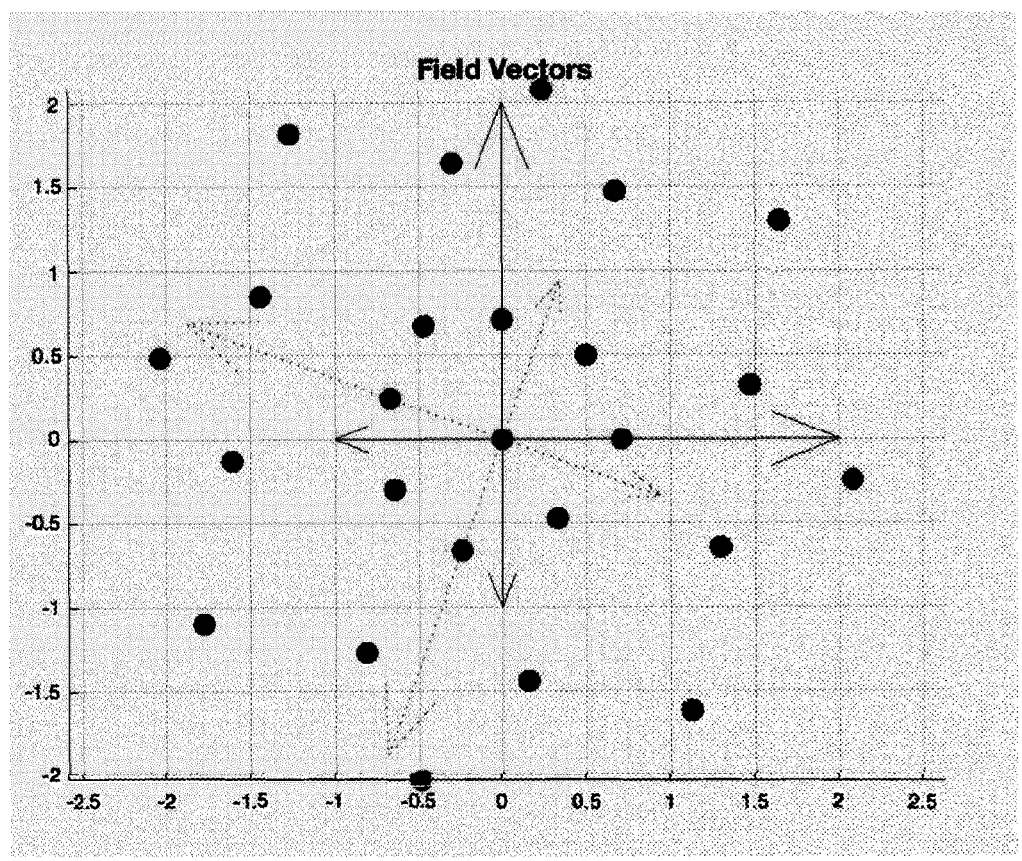
FIG. 5 shows a constellation diagram illustrating a non-ideality when using non-return-to-zero drivers.

FIG. 5 illustrates a constellation diagram corresponding to a device such as that shown in FIG. 4A, but where the modulators or drivers possess a non-ideality. In this example, the non-ideality has led to a phase modulation of less than 180° in each intermediate waveguide. Therefore the 16 constellation points have shrunk in total size relative to the example shown in FIG. 4B, and rotated around the inner-upper-right black point in a clockwise fashion.

Figure 6A:
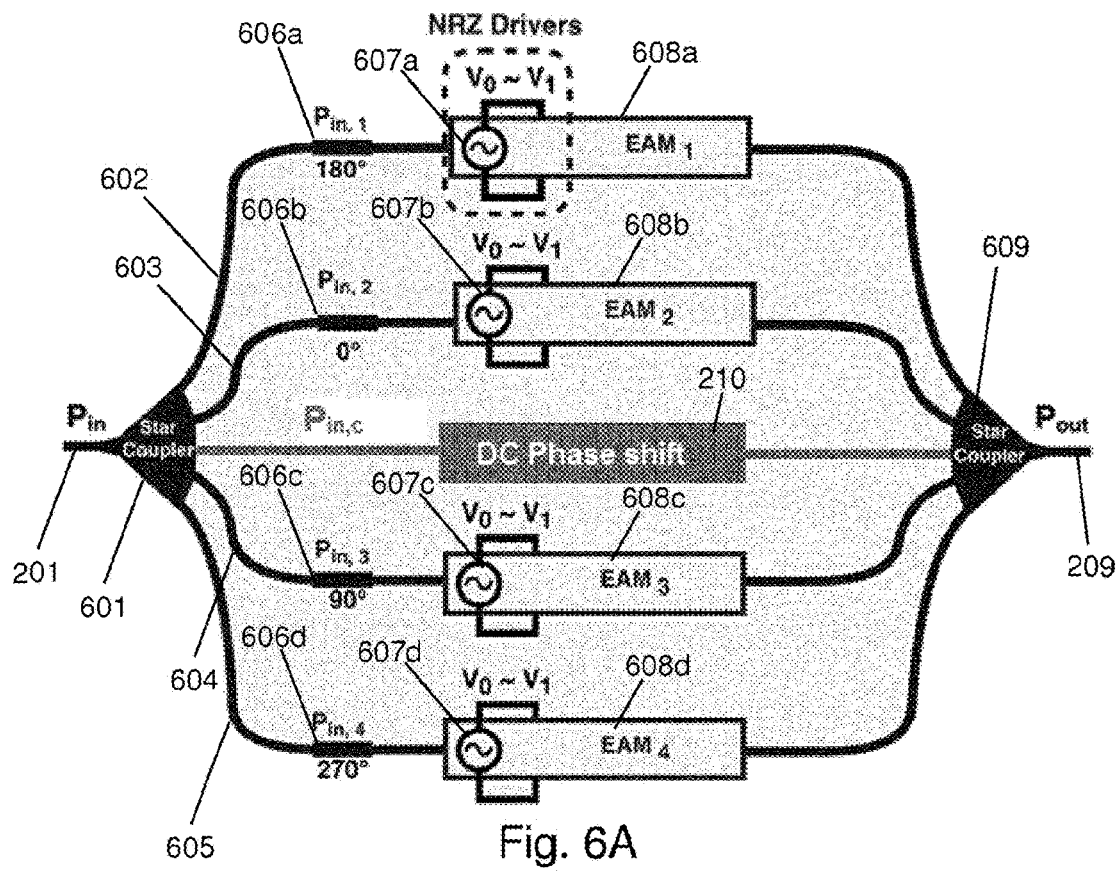
FIG. 6A shows a variant device for QAM-16 modulation.

FIG. 6A shows a further variant device according to some embodiments of the present invention. The input waveguide 201 provides an optical signal with power $P_{in}$ to a 1×5 input star coupler 601. It should be noted that the star coupler could be replaced by a multi-mode interference coupler, which is configured to produce a 1:2:2:1 splitting or coupling ratio. The input coupler in this example splits the light into four intermediate waveguides: a first 602, a second 603, a third 604, and a fourth 605. The input power is split between the intermediate waveguides at a ratio of 1:2:2:1, such that the optical power in two of the intermediate waveguides is twice the optical power in the other two intermediate waveguides. In this example, the input power into the second and third intermediate waveguides is twice the input power into the first and fourth intermediate waveguides. A static relative phase difference between the intermediate waveguides should be as described above, namely: 180°, 00, 90°, and 270°.

Each of the intermediate waveguides of the device shown in FIG. 6A include DC phase shifters 606a-606d as described previously. They also all include an electro-absorption modulator 608a-608d respectively. The modulators should be substantially identical, and so have the same modulation characteristics e.g. length, extinction ratio, and chirp. Each modulator is driven by one of non-return-to-zero drivers 607a-607d. These drivers allow the respective modulator to operate in one of two modulation states. The star output coupler 609 recombines the optical signals from each of the intermediate waveguides and provides a combined modulated output from the device.

Figure 6B:
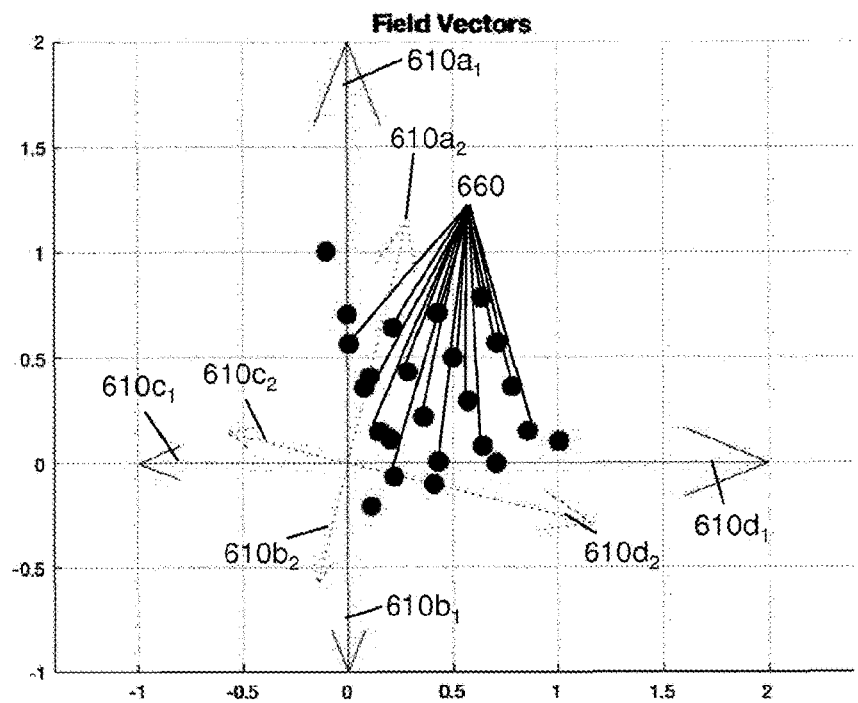
FIG. 6B shows a constellation diagram for the device in FIG. 6A.

A device as shown in FIG. 6A, but without the DC phase shifting intermediate waveguide 210, is able to produce the modulation states 660 shown in FIG. 6B. These are obtained by combining the modulation states of each of the four intermediate waveguides. The first intermediate waveguide 602, provides modulation states $610c_1$ and $610c_2$. Modulation state $610c_1$ corresponds to a 0V signal applied by the driver, e.g. a modulation state where the amplitude of the signal present in the first intermediate waveguide is not modified. Modulation state $610c_2$ corresponds to a signal greater than 0V being applied by the driver, and so the amplitude of the modulation state is less than that of modulation state $610c_1$. Moreover, as the modulator 608a will unintentionally apply a phase shift (known as chirp), modulation state $610c_2$ is not aligned with modulation state $610c_1$. Similarly, second intermediate waveguide 603 is operable to provide modulation states $610d_1$ and $610d_2$. Third intermediate waveguide 604 is operable to provide modulation states $610a_1$ and $610a_2$, and fourth intermediate waveguide 605 is operable to provide modulation states $610b_1$ and $610b_2$.

As has been discussed previously, the constellation diagram has rotated due to the chirp introduced by the electro-absorption modulators. By using the DC phase shifting intermediate waveguide discussed it is possible to shift the constellation centre point back to the origin (0,0).

TABLE 1 discusses two examples of electro-absorption modulators usable with some embodiments of the present invention:

| Version | Standard | Aggressive |
|---|---|---|
| Modulator Type | EAM | EAM |
| EAM Length | 41.5 μm | 78 μm |
| EAM extinction ratio | 4.5 dB | 8.48 dB |
| EAM Δϕ | 0°, 14° | 0°, 26.3° |
| EAM Insertion Loss | 2.98 dB | 5.6 dB |
| Power Splitting Ratio | 1:2:0.78:2:1 | 1:2:0.5:2:1 |
| Driver Type | 4 × Binary NRZ | 4 × Binary NRZ |
| Total Driver Power consumption (50 Gbaud) | Approx. 140 mW | Approx. 260 mW |
| Optical Power Penalty | 23.27 dB | 21.62 dB |

Figure 7:
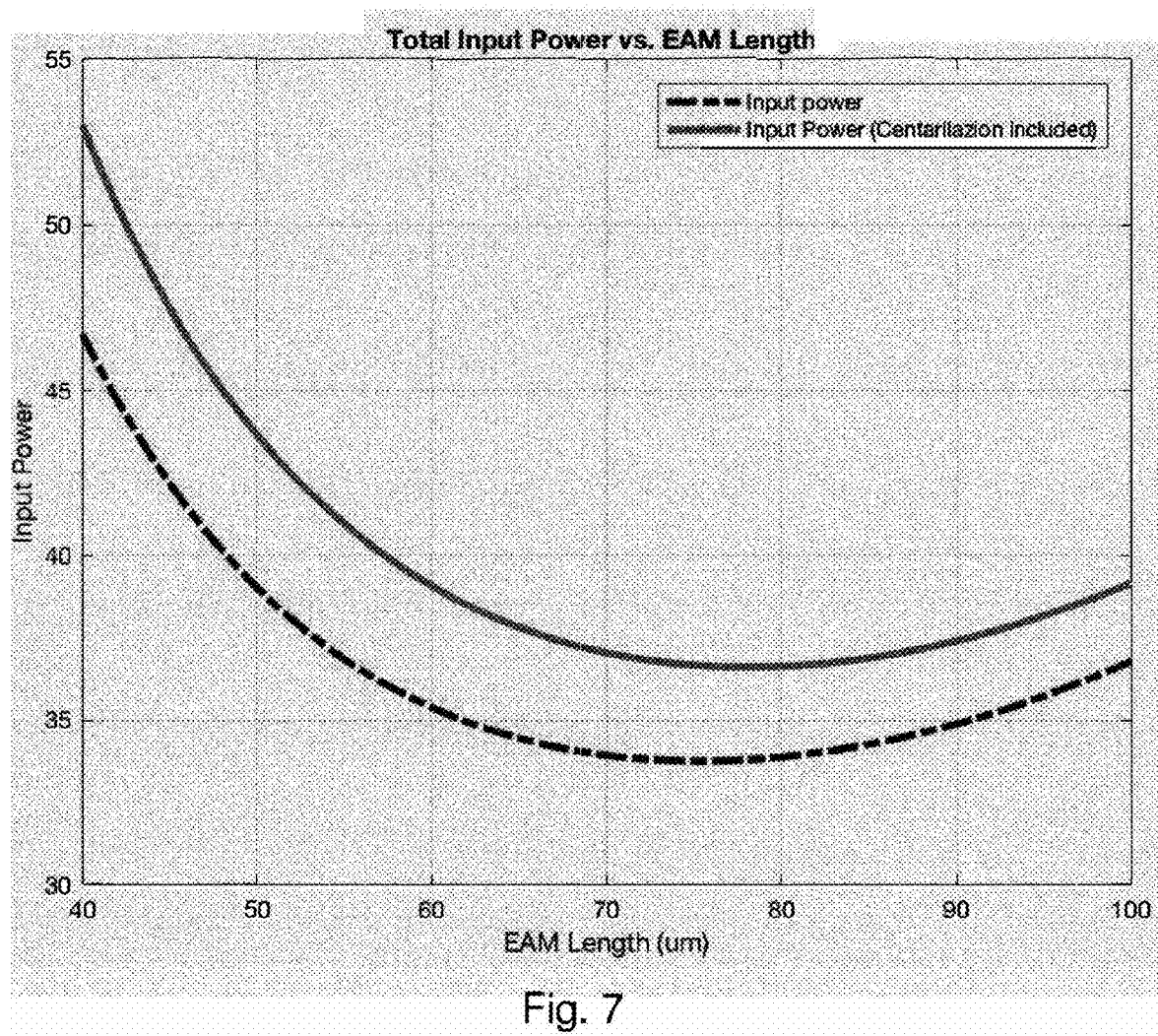
FIG. 7 is a plot showing the variation of in total input power vs modulator length.

FIG. 7 is a plot of representative input power against electro-absorption modulator length. It shows, for example, that when providing an EAM with a length of 41.5 μm an extinction ratio of 4.5 is possible (when centralization is included). Similarly, when an EAM with a length of 78 μm is used an extinction ratio of 8.48 is possible. It can be seen from the plot how much power is required for a given target constellation size (chosen based on the requirements of the device), using an EAM with a certain length (in the x axis). For example, in an illustrative example, to achieve the targeted constellation in FIG. 6B using an EAM with length 41.5 μm (and each EAM having an extinction ratio of 4.5 dB when modulated), will require around 50 mW of input power into the system. Similarly, it can be seen that an optimal length of the EAMs is around 78 µm, giving an extinction ratio of 8.48 dB each, which would require 37 mW of input power.

In general, increasing the EAM length improves the system since the extinction ratio associated with the EAM increases. However, the insertion loss also increases with length and there may be a trade-off that results in an optimum point which minimises the required input power.

Figure 8A:
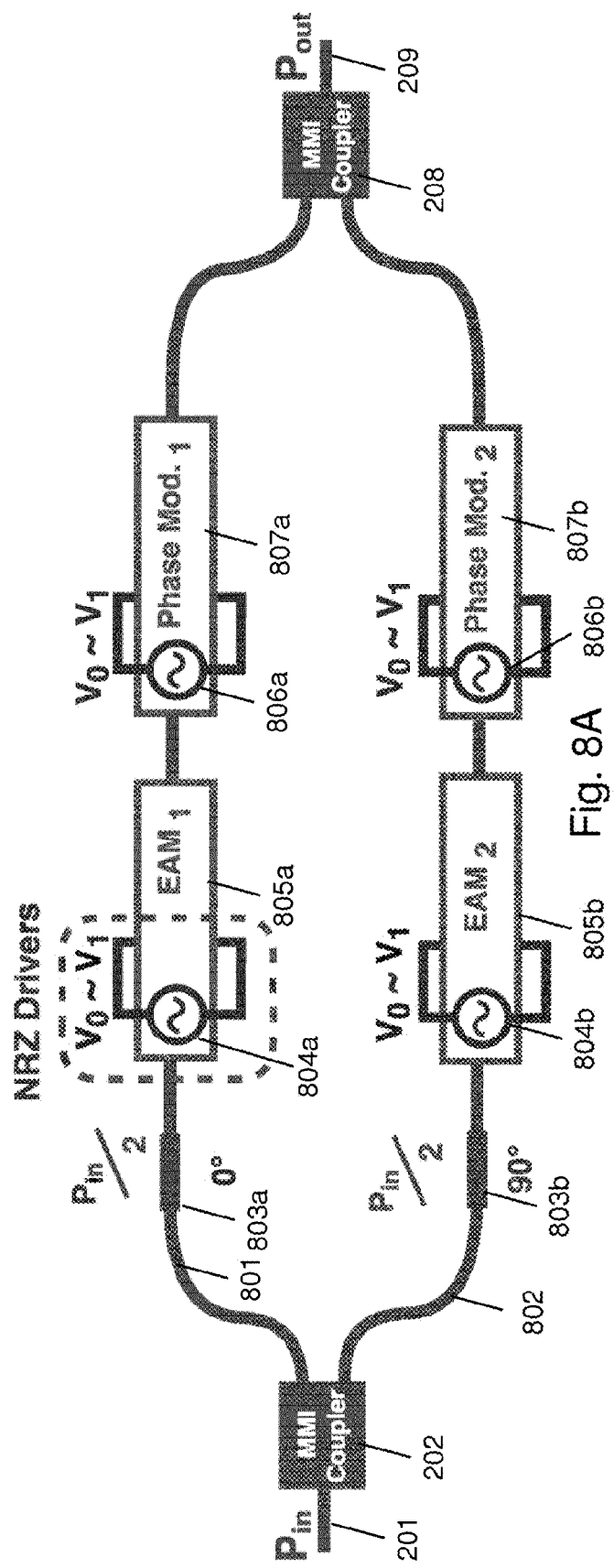
FIG. 8A shows a variant device for QAM-16 modulation.

FIG. 8A shows a further variant device according to some embodiments of the present invention. It shares a number of features with the device shown in FIG. 2A, and so like features are indicated by like reference numerals.

The first intermediate waveguide 801 of this device includes, disposed along its length, a DC phase shifter 803a, followed by an electro-absorption modulator 805a, and finally a phase modulator 807a. The electro-absorption modulator and phase modulator are driven by respective non-return-to-zero (NRZ) drivers 804a and 808a. Therefore, an optical signal provided to the first intermediate waveguide 801 via the coupler 202 may be modulated in both amplitude and phase by a single intermediate waveguide. The second intermediate waveguide 802 similarly includes a DC phase shiftier 803b, electro-absorption modulator 805b, and phase modulator 807b. Whilst these examples show the EAM and phase modulators arranged with the phase modulator after the EAM, it is of course possible to reverse this order.

The phase modulators 807a and 807b should be operable to modulate the phase of light passing therethrough between the states of 0° and 180° relative phase difference. The EAMs 805a and 805b should be operable to generate an extinction ratio of 20×log(3/1)=9.54 dB with zero chirp so as to provide equally spaced constellation points. The right length for the EAM should be chosen so as to avoid high insertion losses. One method for compensating for EAM chirp is to segment the respective phase modulator into a main segment and a smaller secondary segment, and use the smaller secondary segment to correct the phase change induced by the EAM. This would require a second smaller electronic binary NRZ driver for the smaller secondary segment of the phase modulator.

The input coupler 201 and output coupler 208 may be a 3-dB coupler. A static relative phase difference between the two intermediate waveguides should be set at 90°. As noted before, non-idealities in the phase modulators or EAMs may cause the centre point of a constellation corresponding to the output of the device to shift and rotate. If so, an additional DC phase shifting intermediate waveguide may be introduced as discussed previously. If such an intermediate waveguide is introduced, the input and output couplers should be modified to a 1×3 configuration with the appropriate splitting/coupling ratios.

Figure 8B:
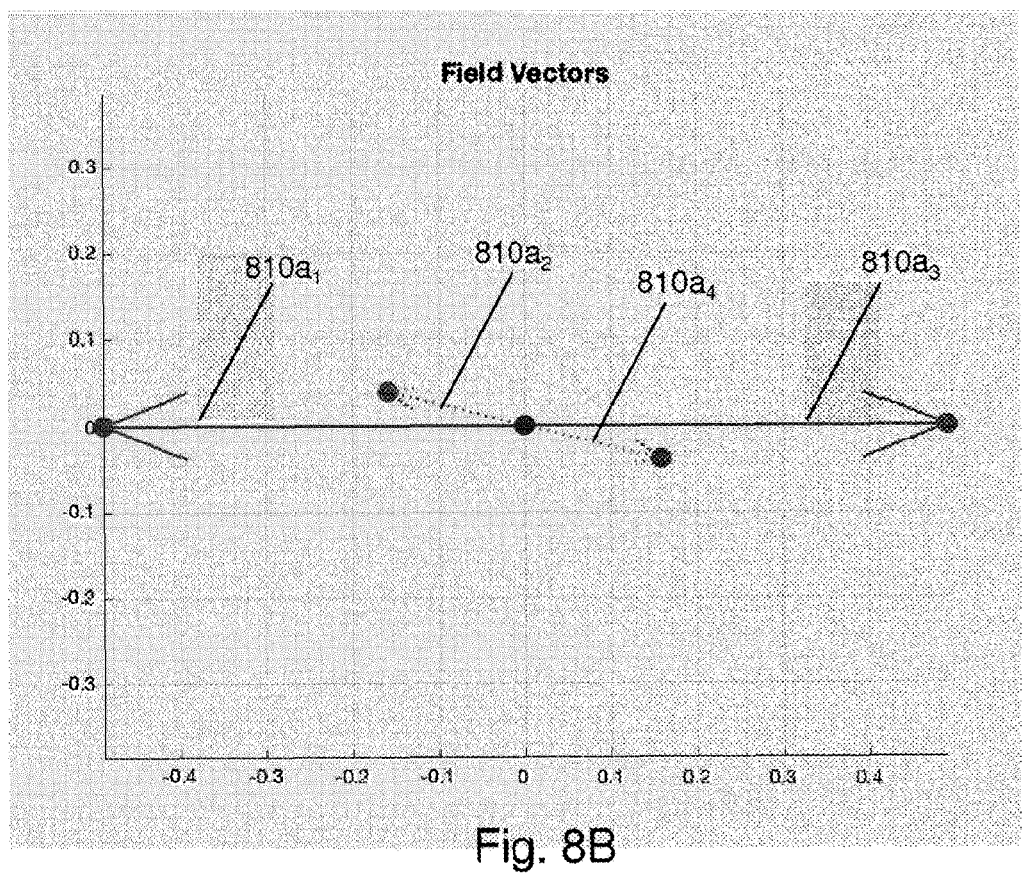
FIG. 8B shows a constellation diagram for the device in FIG. 8A.

FIG. 8B shows a constellation diagram indicating the possible modulation states of one of the intermediate waveguides. Modulation state $810a_1$ is achieved by modulating neither amplitude nor phase. Modulation state $810a_2$ is achieved by modulating only the amplitude of the light passing through the respective intermediate waveguide. Modulation state $810a_3$ is achieved by modulating only the phase of the light passing therethrough, and modulating state $810a_4$ is achieved by modulating both the amplitude and the phase of the light. It should be noted in this diagram, that the chirp incurred by the EAMs is not corrected for, and so modulation states $810a_2$ and $810a_4$ are not aligned with $810a_1$ and $810a_3$ respectively.

Similar behaviour occurs in the other of the two intermediate waveguides, whilst statically rotated by 90°, to thereby provide 16 constellation points at the output coupler. In this example, an extinction ratio of 9.54 dB and an arbitrary chirp of 14° is assumed for the EAMs.

FIG. 9 shows an example chip layout incorporating a device as shown in FIG. 6A. Like features are indicated by like reference numerals. A pitch 902, between adjacent waveguides containing modulating components is around 2 mm and a distance 903 of each modulating component from an edge of the chip is around 271 µm and may be around 254 µm. The lower portion 901 of the chip is given over to testing structures.

Figure 10:
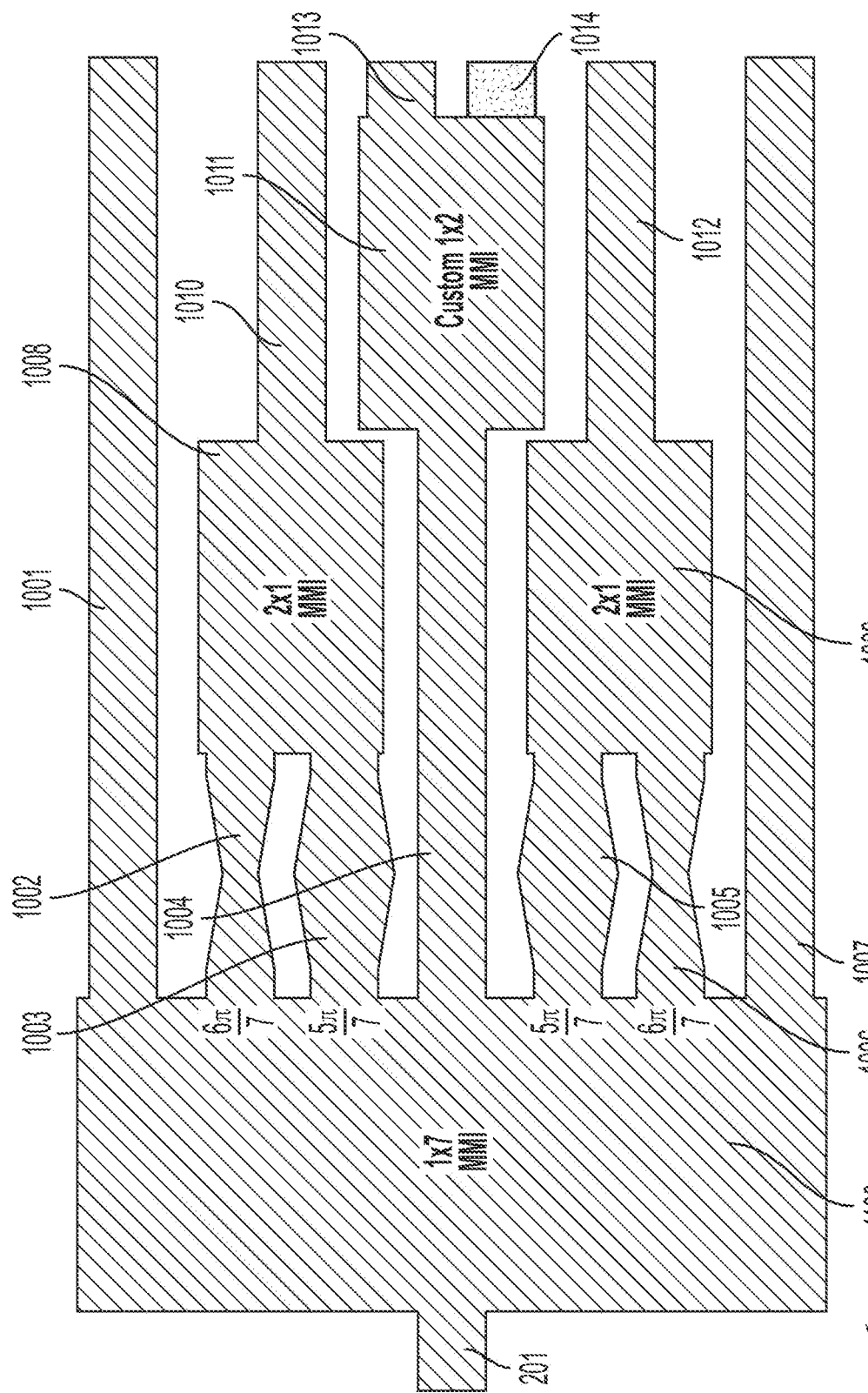
FIG. 10 shows a schematic view of an optimised coupler.
Figure 11:
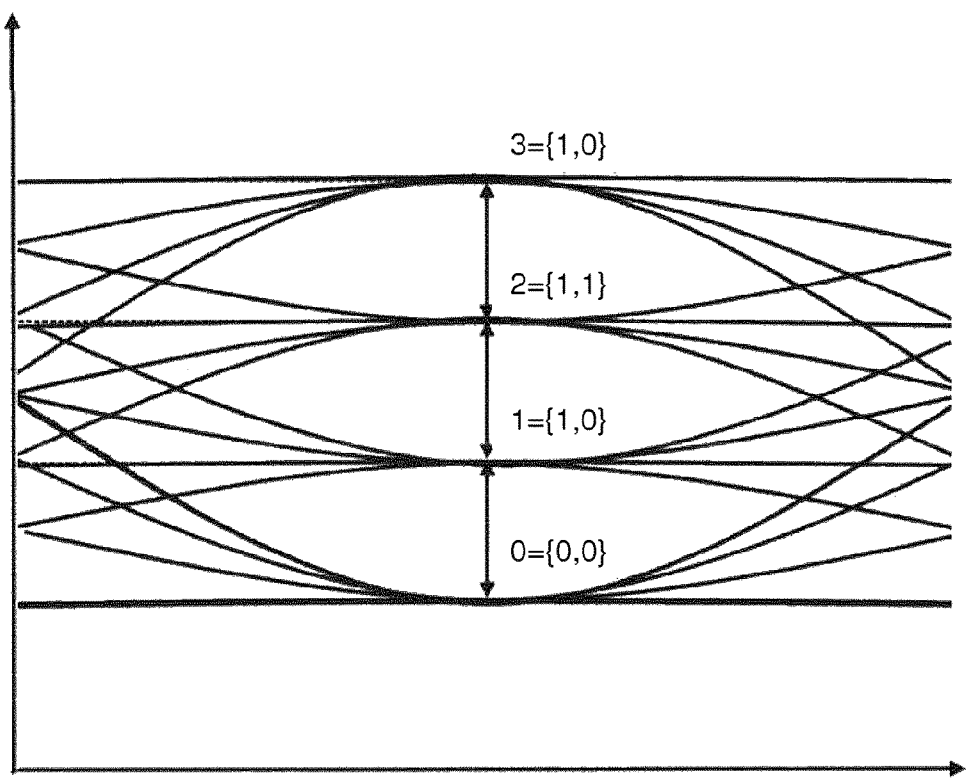
FIG. 11 shows a plot of signal (in normalised units) against time.

FIG. 10 shows an optimized coupler which forms a part of this disclosure. The coupler 1000 shown may be provided as an implementation of either the input or output coupler (or both) where the device has more than two intermediate waveguides. In an example where the optimized coupler is an input coupler, it is connected at one end to the input waveguide 201 discussed above. The input waveguide 201 connects to a 1×7 multi-mode interference portion 1100, which divides light between seven channels. Two pairs of the channels: 1002 and 1003, and 1005 and 1006, are combined so that the coupler is a 1×5 coupler. However, the portions of light arriving at channels 1002 and 1003 are out of phase by $$\frac{\pi}{7},$$

as they have respectively experienced relative phase shifts of:

$$\frac{6\pi}{7} \text{ and } \frac{5\pi}{7}.$$

Similarly, the portions of light arriving channels 1005 and 1006 are also out of phase by $$\frac{\pi}{7},$$

as they have respectively experienced relative phase shifts of $$\frac{5\pi}{7} \text{ and } \frac{6\pi}{7}.$$

Therefore, if left unmodified, when the portions of light recombined in 2×1 MMIs 1008 and 1009, the phase mismatch would cause significant losses. In order to rectify this, channels 1002, 1003, 1005, and 1006 have widths which taper in a direction parallel to the guiding direction of the channel. In channels 1002 and 1006, the width of the channel initially decreases before increasing after a midpoint in the channel. Whereas, the width of channels 1003 and 1005 initially increase before decreasing after a midpoint of the channel. Tapered channels such as these can be engineered in order to remove any relative phase shift between respective pairs of channels. Each pair of channels connects to a 2×1 MMI, which provides output channels 1010 and 1012 of the coupler.

The remaining three channels: 1001, 1004, and 1007 are not combined and so there are no issues regarding phase mismatch. These channels therefore correspond to further output channels of the coupler. Each of channels 1001, 1010, 1013, 1012, and 1007 are connected to a respective intermediate waveguide. In channel 1004, a custom 1×2 MMI 1011 is provided, an output channel 1013 is provided from the splitter and in this example is connected to the DC phase shifting intermediate waveguide. A channel 1014 is connected to the MMI but receives no output from the splitter. In examples where the EAM length is 41.5 µm, a final splitting/coupling ration of 1:2:0.78:2:1 may be needed.

The output of the first 1×7 MMI is 1:1:1:1:1:1:1 and after phase correction and combinations of the inner waveguides, before the last custom 1×2 MMI, the splitting ratio may be 1:2:1:2:1. The middle arm may be decreased from 1 to 0.78 and that is the role of the last custom 1×2 MMI. This last 1×2 MMI may be custom designed to provide a 0.78 portion of the input light. The other output of it (0.22 portion which corresponds to the output number 1014) is not used in the system (i.e. it is "thrown away" when the whole thing is used as a splitter or has a zero input light to it when used as a coupler). In the case of the splitter when the 0.22 portion is discarded, it is ensured that this portion will not reflect back to the splitter to distort the performance.

Other techniques can be used to achieve a 1:2:0.78:2:1 (or in general 1:2:x:2:1) splitting/coupling ratios, such as a custom designed 1×5 star coupler by engineering the output waveguide widths and positions. However, MMI couplers may have clean outputs and perform better and more robust through process variations.

If the output coupler is implemented according to the optimized coupler above, the ordering is reversed i.e. it will receive light into each of channels 1001, 1010, 1013, 1012, and 1007 and provide light out of output waveguide 209.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

LIST OF FEATURES

Figure 12:
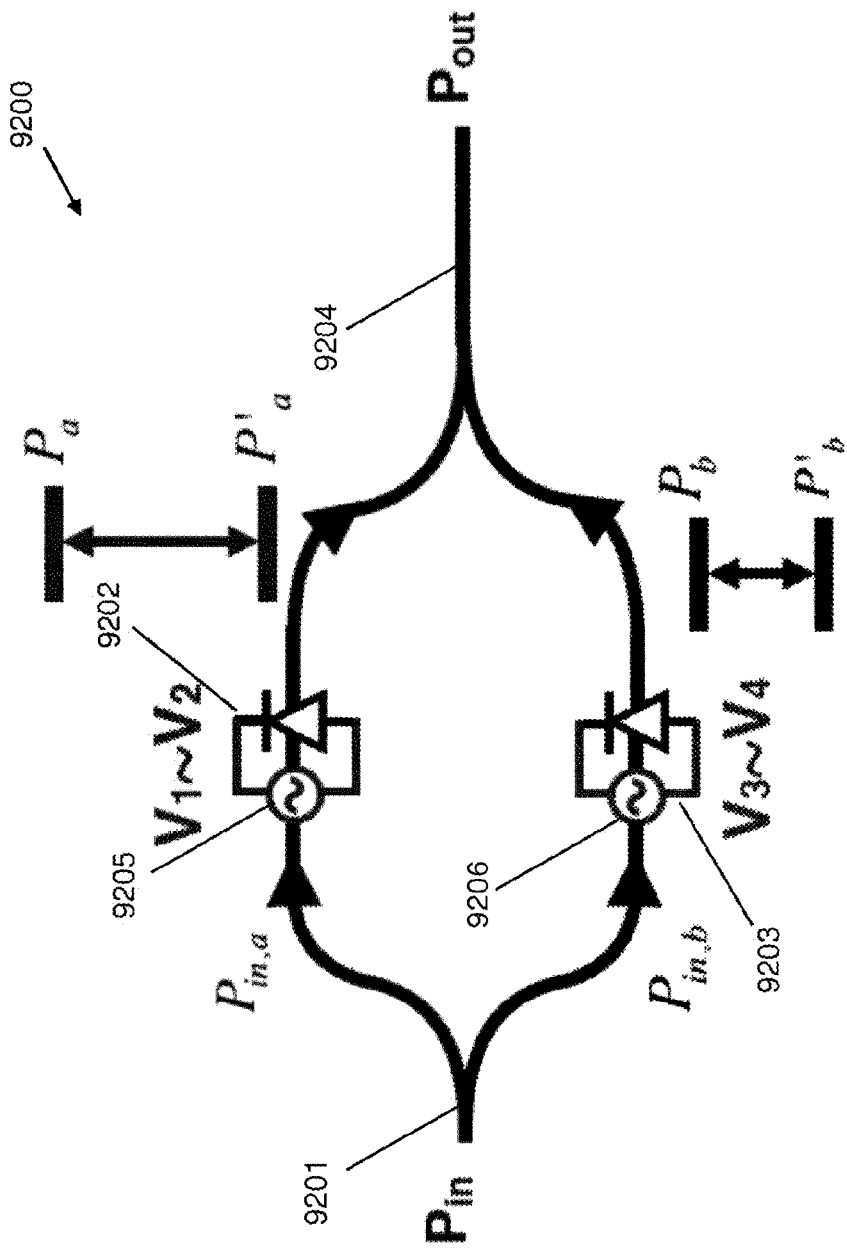
FIG. 12 shows an optical device.

- 101 Constellation point
- 102 Centre of constellation
- 201 Input waveguide
- 202 MMI input coupler
- 203 First intermediate waveguide
- 204 Second intermediate waveguide
- 205 DC phase shifter
- 206 EAM
- 207 PAM-4 driver
- 208 MMI output coupler
- 209 Output waveguide
- 210 DC phase shifter
- 211 16-point constellation
- 212 Outputs from first intermediate waveguide
- 213 Outputs from second intermediate waveguide
- 301 MMI input coupler
- 302 Phase modulator
- 310 Outputs from first intermediate waveguide
- 311 Outputs from second intermediate waveguide
- 401 Star input coupler
- 402 First intermediate waveguide
- 403 Second intermediate waveguide
- 404 Third intermediate waveguide
- 405 Fourth intermediate waveguide
- 406*a-d* DC phase shifters
- 407*a-d* NRZ drivers
- 408*a-d* Phase modulators
- 409 Star output coupler
- 410$n_i$ Modulation state
- 440 Constellation points
- 601 Star input coupler
- 602 First intermediate waveguide
- 603 Second intermediate waveguide
- 604 Third intermediate waveguide
- 605 Fourth intermediate waveguide
- 606*a-d* DC phase shifters
- 607*a-d* NRZ drivers
- 608*a-d* Electro-absorption modulators
- 609 Star output coupler
- 610$n_i$ Modulation state
- 660 Constellation points
- 801 First intermediate waveguide
- 802 Second intermediate waveguide
- 803*a/b* DC Phase shifter
- 804*a/b* NRZ driver for EAM
- 805*a/b* Electro-absorption modulator
- 808*a/b* NRZ driver for phase modulator
- 807*a/b* Phase modulator
- 810$n_i$ Modulation state
- 901 Test area
- 902 Pitch
- 903 Distance from edge of chip
- 1000 Optimized coupler
- 1001-14 Channels
- 1100 1×7 MMI
- 1008, 1009 2×1 MMI
- 1011 Customised 1×2 MMI FIG. 12 shows an optical device 9200, which broadly comprises: an input waveguide 9201, a first electro-absorption modulator 9202, a second electro-absorption modulator 9203, and an output waveguide 9204. Light enters the input waveguide, and has a power $P_{in}$. This is then divided between the first and second electro-absorption modulators, as they are disposed in different optical paths of the device. The first electro-absorption modulator receives $P_{in,a}$, and the second electro-absorption modulator receives $P_{in,b}$. The modulators are driven, respectively, by AC sources 9205 and 9206 at voltages $V_1$, $V_2$, $V_3$, or $V_4$. Light then exits via output waveguide 9204, having an associated power $P_{out}$.

The first electro-absorption modulator 9202 is operable to produce an output with either a first $P_a$ or second $P_a'$ power level. As shown in FIG. 12, the second power level is less than the first power level. Similarly, the second electro-absorption modulator is operable to produce an output with either a third $P_b$ or second $P_b'$ power level. This allows PAM-4 modulation, as at least four amplitudes are available from the device.

Figure 13:
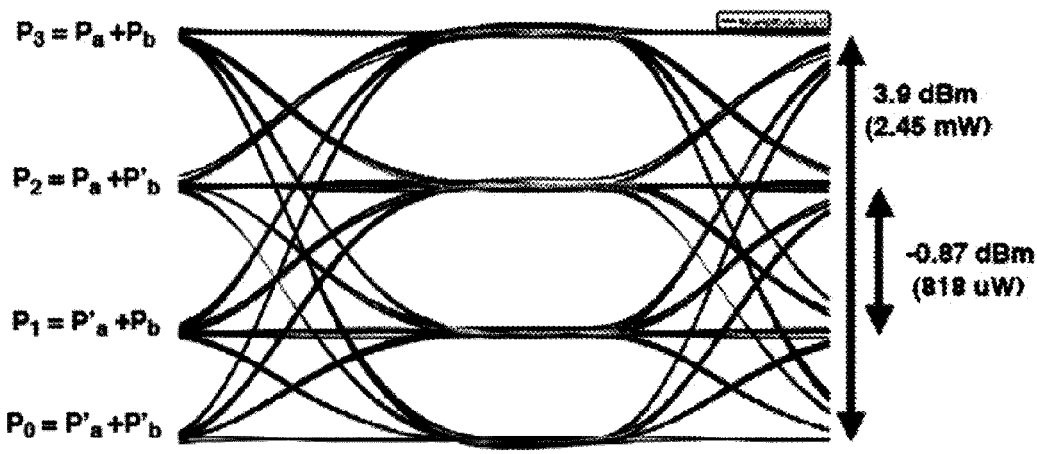
FIG. 13 shows a plot of signal against time for the optical device shown in FIG. 12.
Figure 14A:
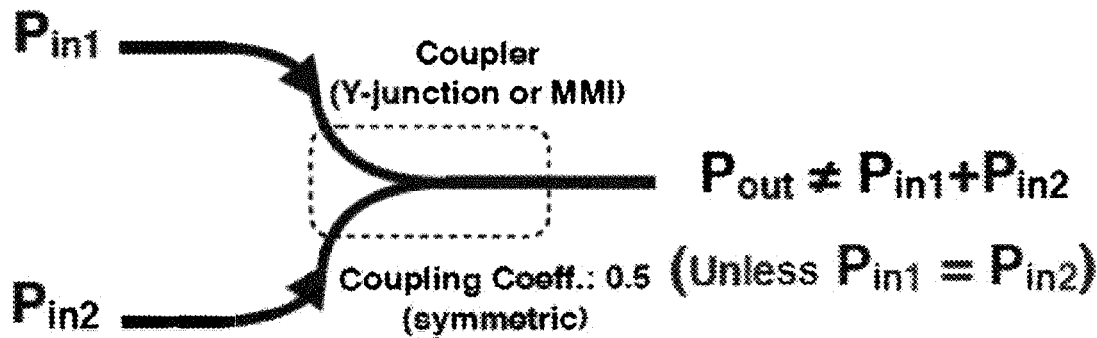
FIGS. 14A and 14B show, respectively, the behaviour of a coupler of the optical device of FIG. 12.
Figure 14B:
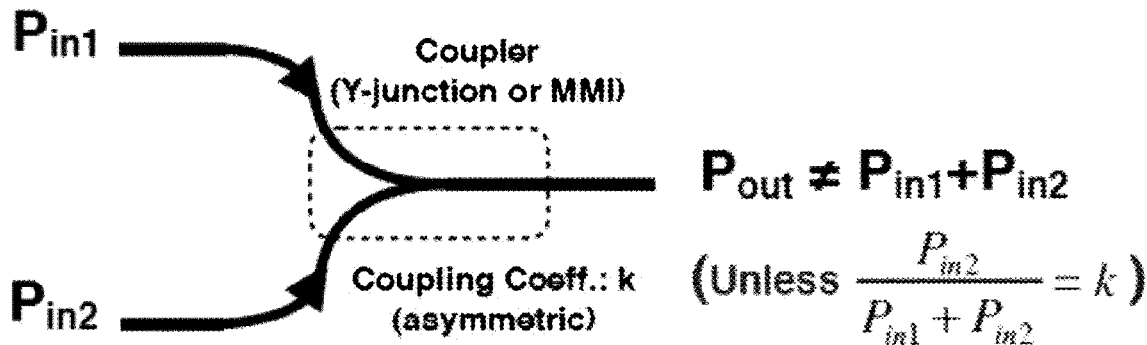

FIG. 13 shows the outputs available from a device as discussed above. The lowest output in power output, $P_0$ is formed by a combination of $P_a$ and $P_b$. The next output, increasing in power, $P_1$, is formed by a combination of $P_a$ and $P_b$. Next, $P_2$ is formed by a combination of $P_a$ and $P_b$. Finally, $P_3$, with the highest output power is formed by a combination of $P_a$ and $P_b$. The difference, $\Delta P_{(0,3)}$, between $P_0$ and $P_3$ is around 3.9 dBm (or 2.45 mW). Whereas a difference $\Delta P_{1,2}$, between $P_1$ and $P_2$ is around −0.87 dBm (or 818 µW).

The combined output power, as well as individual powers generated by each of the first and second electro-absorption modulators, can be calculated as follows:

$$OMA_{total} = P_3 - P_0 = 2.45 \text{ mW} \qquad P_3 = 3.58 \text{ mW}$$

$$ER = 10\log\left(\frac{P_3}{P_0}\right) = 5 \qquad \Rightarrow P_2 = 2.77 \text{ mW}$$

$$P_{i+1} - P_i = \frac{OMA_{total}}{3} = 817 \text{ }\mu W \qquad P_1 = 1.95 \text{ mW}$$

$$P_0 = 1.13 \text{ mW}$$

where $OMA_{total}$ is the total optical modulation amplitude of the PAM-4 signal and ER is the extinction ratio. These four output power levels, $P_3$, $P_2$, $P_1$, and $P_0$ should be generated by the power combination of the two arms of the device (i.e. the two electro-absorption modulators). However, it may be important to consider whether the output powers of the electro-absorption modulators add linearly to generate the final output power levels.

The field vectors of the each output power may be summed to provide the total output power. Therefore, for a symmetric coupler, the total output power may be described by:

$$P_{out} = \left|\frac{1}{\sqrt{2}}\sqrt{P_{in1}}\,e^{j\theta_1} + \frac{1}{\sqrt{2}}\sqrt{P_{in2}}\,e^{j\theta_2}\right|^2 \qquad (1)$$

OR $$P_{out} = \left|\frac{1}{\sqrt{2}}\sqrt{P_{in1}} + \frac{1}{\sqrt{2}}\sqrt{P_{in2}}\right|^2 \qquad (2)$$

Equation (1) is used where there is a phase difference between the light output from the first electro-absorption modulator and the light output from the second electro-absorption modulator. Equation (2) is used where there is no phase difference.

It is noted that, in this example, even when there is zero phase difference the output power of the device is not a linear addition of the respective output powers of the electro-absorption modulators.

The total output power may be described by:

$$P_{out} = \left|\sqrt{(1-k)P_{in1}}\,e^{j\theta_1} + \sqrt{(k)P_{in2}}\,e^{j\theta_2}\right|^2 \qquad (3)$$

OR $$P_{out} = \left|\sqrt{(1-k)P_{in1}} + \sqrt{(k)P_{in2}}\right|^2 \qquad (4)$$

Where k is the coupler coefficient.

Equation (3) is used where there is a phase difference between the light output from the first electro-absorption modulator and the light output from the second electro-absorption modulator. Equation (4) is used where there is no phase difference. Equations (3) and (4) are generally true for any value of k where 0<k<1. In examples where the output power $P_{out}$ is equal to $P_{in1}+P_{in2}$, k may be set to equal $$\frac{P_{in2}}{P_{in1}+P_{in2}}$$

In this example. the equations describing the generation of the 4 output levels of the device would be as follows:

$$\sqrt{(1-k)P_a}+\sqrt{kP_b}=\sqrt{P_3}$$

$$\sqrt{(1-k)P_a}+\sqrt{kP_b'}=\sqrt{P_2}$$

$$\sqrt{(1-k)P_a'}+\sqrt{kP_b}=\sqrt{P_1}$$

$$\sqrt{(1-k)P_a'}+\sqrt{kP_b'}=\sqrt{P_0}$$

This can be considered as a set of 4 non-linear equations, with 5 unknowns: $P_a$, $P_a'$, $P_b$, $P_b'$, and k. However, the equations can be manipulated and rewritten in the following form:

$$a+b=\sqrt{P_3}$$

$$a+b'=\sqrt{P_2}$$

$$a'+b=\sqrt{P_1}$$

$$a'+b'=\sqrt{P_0}$$

This forms a set of 4 linear equations with 4 unknowns. As the left-hand side of the this set of linear equations are dependent (i.e. a linear combination of 3 chosen equations can build the $4^{th}$), an associated matrix A to this system is singular (i.e. if the system above is written in the form Ax=b where x is the vector of unknowns, the 4-by-4 matrix A would have a rank of 3 rather than 4).

For this set of equations to have any solutions, it should be required that:

$$\sqrt{P_1}+\sqrt{P_2}=\sqrt{P_0}+\sqrt{P_3}$$

And as it is preferred that the output power levels be equally spaced, it should be stated that:

$$P_1+P_2=P_0+P_3$$

It is preferred to calculate a set of values for a, b, a', and b' which minimises an error of the system described above. This can be formulated as a convex optimization problem, with several factors to consider minimising in this system.

Figure 15:
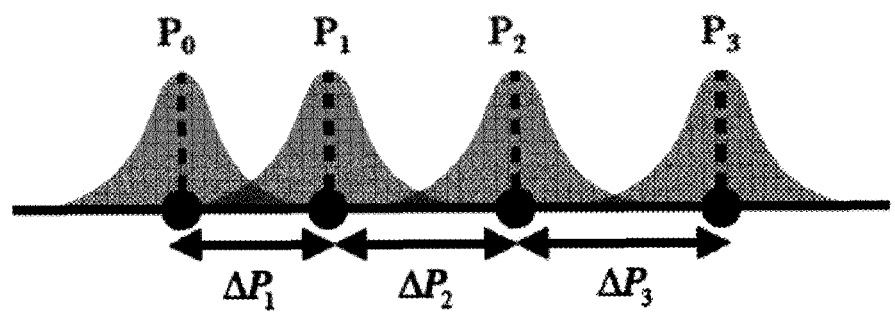
FIG. 15 shows a plot of PAM-4 transmission, together with Gaussian noise.

Therefore, set out below is a derivation of an equation for an unequally spaced PAM-4 bit-error-rate. The derivation assumes: that symbols are equally likely to be transmitted; any noise is Gaussian in form; and that the noise and its power is independent from the optical signal. FIG. 15 is a demonstration of a PAM-4 transmission which includes Gaussian noise.

The symbol error rate may be stated as:

$$P_s = \frac{1}{2}\left[Q\left(\sqrt{\frac{\Delta P_1}{2N_0}}\right) + Q\left(\sqrt{\frac{\Delta P_2}{2N_0}}\right) + Q\left(\sqrt{\frac{\Delta P_3}{2N_0}}\right)\right]$$

where $$Q(x) = \frac{1}{\sqrt{2\pi}}\int_x^\infty e^{\frac{t^2}{2}}\,dt,$$

t is time, Q is a Q function, and $N_0$ is the Gaussian noise power in mW/Hz.

It can be noted that the dominant factor in affecting the bit-error-rate will be the smallest output level (i.e. $P_0$), as the changes in the Q function are steep as the argument goes beyond 7 to achieve a bit-error-rate of the order −12.

Therefore, the constraints that should be used in the optimizer result in solving the following problem:

System: $Ax = b$

Optimization parameters:
$\min(|eye_3 - eye_2|^2)$
$\min(|eye_2 - eye_1|^2)$
$\min(|eye_1 - eye_3|^2)$ Constraints: $eye_i \geq \dfrac{OMA_{outer}}{3}$ for $i = 1, 2, 3$ $$x = \begin{bmatrix} a \\ a' \\ b \\ b' \end{bmatrix}, \quad b = \begin{bmatrix} \sqrt{P_3} \\ \sqrt{P_2} \\ \sqrt{P_1} \\ \sqrt{P_0} \end{bmatrix}, \quad A = \begin{bmatrix} 1 & 1 & 0 & 0 \\ 1 & 0 & 1 & 0 \\ 0 & 1 & 1 & 0 \\ 0 & 1 & 0 & 1 \end{bmatrix}$$

Where eye refers to the output level for a particular level of PAM-4 modulation.

Figure 16:
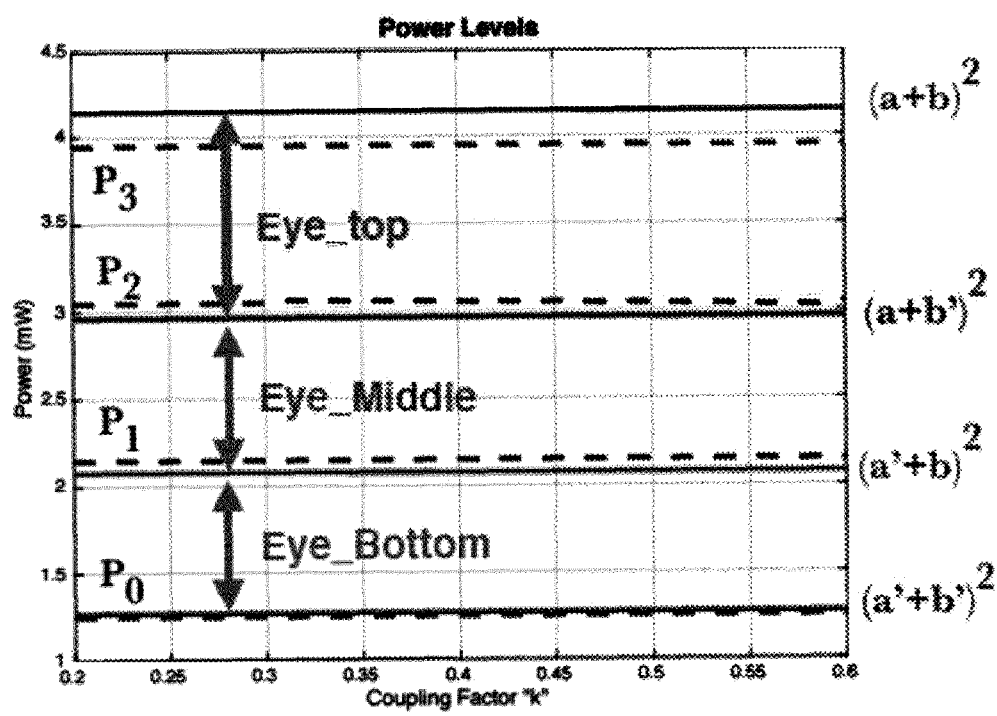
FIG. 16 shows a plot of power against coupling factor k.

The results of this optimization are shown in FIG. 16. The levels are unequally spaced, however the minimum output level is still larger than the minimum eye closure requirement.

Figure 17A:
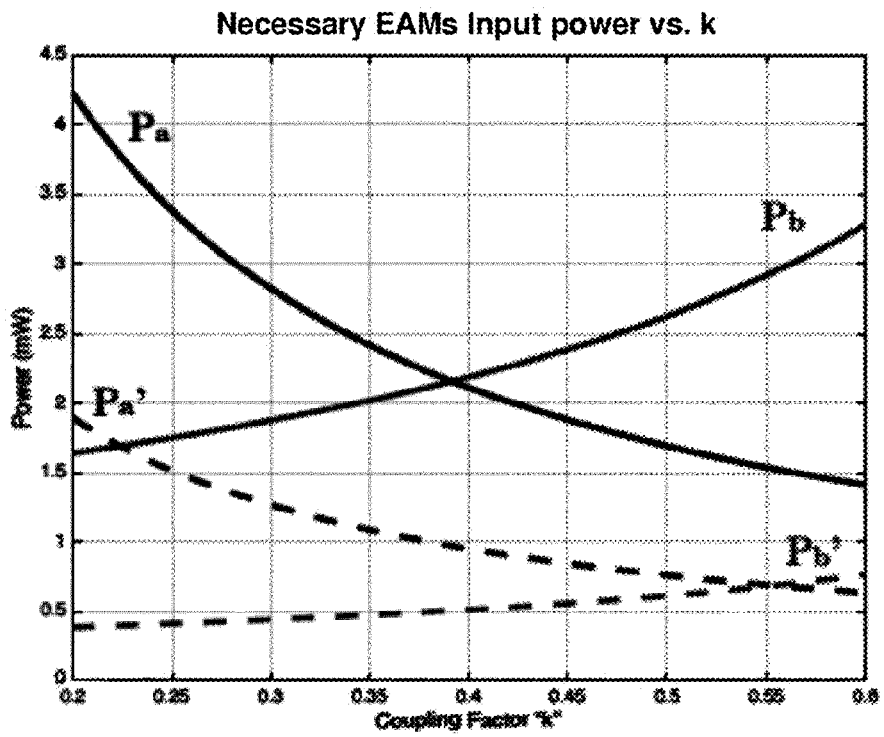
FIG. 17A shows a plot of EAM output power against coupling factor k.

The extinction ratios for each of the first and second electro-absorption modulators can therefore be calculated as:

$a = \sqrt{(1-k)P_a}$ $a' = \sqrt{(1-k)P'_a} \Rightarrow ER_1 = 10\log\left(\left(\dfrac{a}{a'}\right)^2\right) = 6.33$ dB $b = \sqrt{(1-k)P_b}$ $b' = \sqrt{(1-k)P'_b} \Rightarrow ER_2 = 10\log\left(\left(\dfrac{b}{b'}\right)^2\right) = 3.49$ dB It may be useful to determine the optimum coupling coefficient k to use in order to minimize the necessary input power to the device. The plot in FIG. 17A shows that by sweeping over k, it is possible to achieve different combinations of the first and second electro-absorption modulator output powers necessary for operation. From this data, and by considering the insertion loss from each modulator, the necessary input power to the first and second electro-absorption modulators and their sum (which is generally referred to as a measure for the total input power) can be derived as shown in FIG. 17B.

Figure 17B:
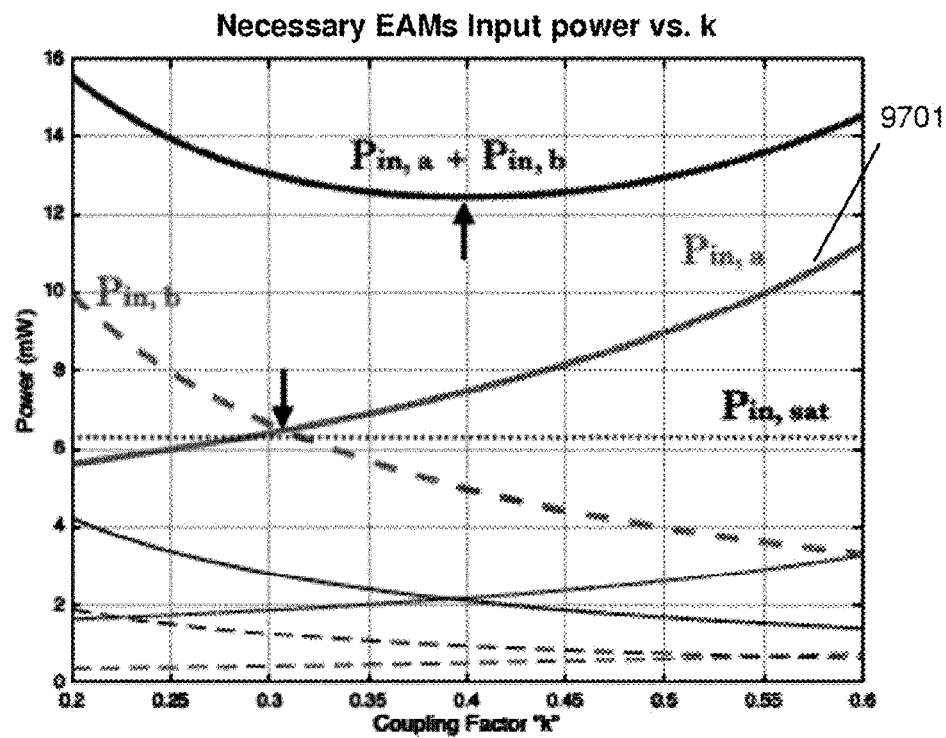
FIG. 17B shows a plot of EMA input power against coupling factor k.

One limit for input power may be that the input power to each of the first and second electro-absorption modulator respectively should not exceed +8 dBm (the line 9701 indicated in FIG. 17B). This limit results in the optimum value fork being around 0.39 (which would result in a minimisation of the necessary total input power). However, due to the saturation input power constraint, a value of k=0.3 is also considered.

Figure 18:
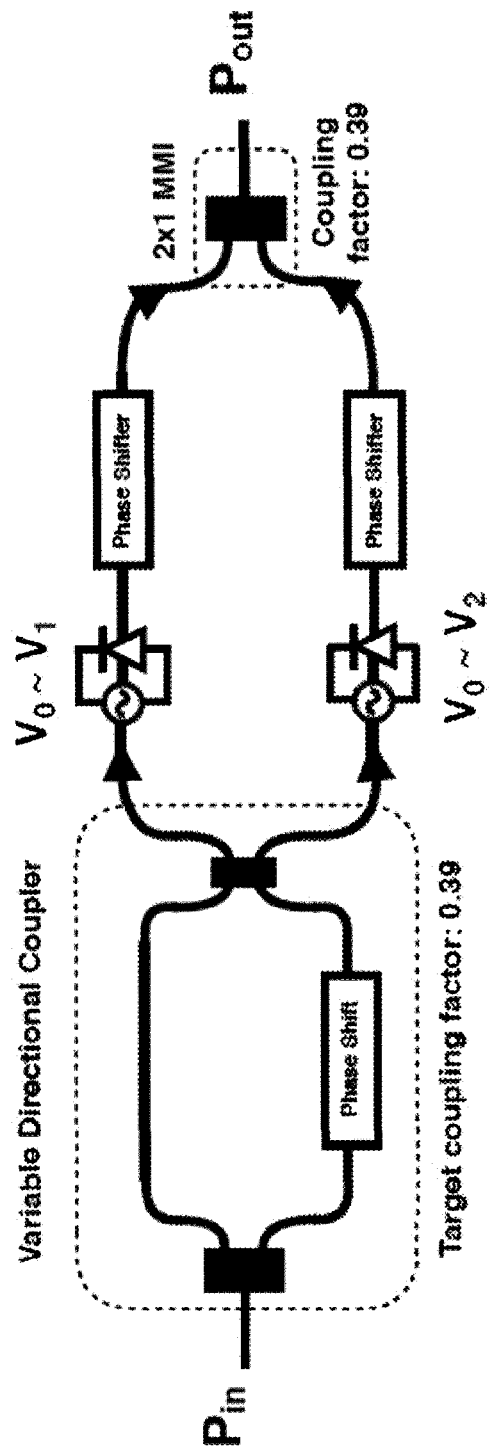
FIG. 18 shows a variant optical device.

When using multimode interference couplers for output coupler and input coupler, and assuming an excess loss of 0.1 dB for each, a proposed circuit is shown in FIG. 18. The specifications for this circuit are discussed in tables 1 and 2 below:

TABLE 1

(where k = 0.39)

| Sections | EAM Lengths (μm) | ER (dB) | $P_{off}$ (mW) | $P_{on}$ (mW) | $P_{in}$ (mW) | Insertion Loss (dB) | Link penalty (dB) |
|---|---|---|---|---|---|---|---|
| Arm 1 | 66 | 6.33 | 2.18 | 0.51 | 7.45 | 5.34 | 6.49 |
| Arm 2 | 48 | 3.49 | 2.12 | 0.95 | 5.00 | 3.73 | 6.3 |
| Total | — | 4.95 | 4.26 | 1.36 | 12.46 | 4.66 | 6.33 |

TABLE 2

(where k = 0.3)

| Sections | EAM Lengths (μm) | ER (dB) | $P_{off}$ (mW) | $P_{on}$ (mW) | $P_{in}$ (mW) | Insertion Loss (dB) | Link penalty (dB) |
|---|---|---|---|---|---|---|---|
| Arm 1 | 66 | 6.33 | 1.9 | 0.44 | 6.49 | 5.34 | 6.49 |
| Arm 2 | 48 | 3.49 | 2.74 | 1.23 | 6.44 | 3.72 | 6.3 |
| Total | — | 4.95 | 4.26 | 1.36 | 12.94 | 4.82 | 6.49 |

Of particular note is that the devices discussed above require no digital to analogue converters in order to operate as PAM-N modulating devices. All driver signals on the electro-absorption modulators may be the same, and the laser power into the device can be increased by 3 dB relative to a transmitter implemented with a single electro-absorption modulator or a series of modulators in a single waveguide.

Moreover, variable couplers or tunable Mach-Zehnder interferometers can be used at the input and output of the device (i.e. coupled with the input waveguide and output waveguide respectively) to adjust the input and output split ratios. This can compensate for non-perfectly linearly separated layers generated at the output of the device due to the absorption of the electro-absorption modulators and/or the phase responses being different from different modulators.

Figure 19:
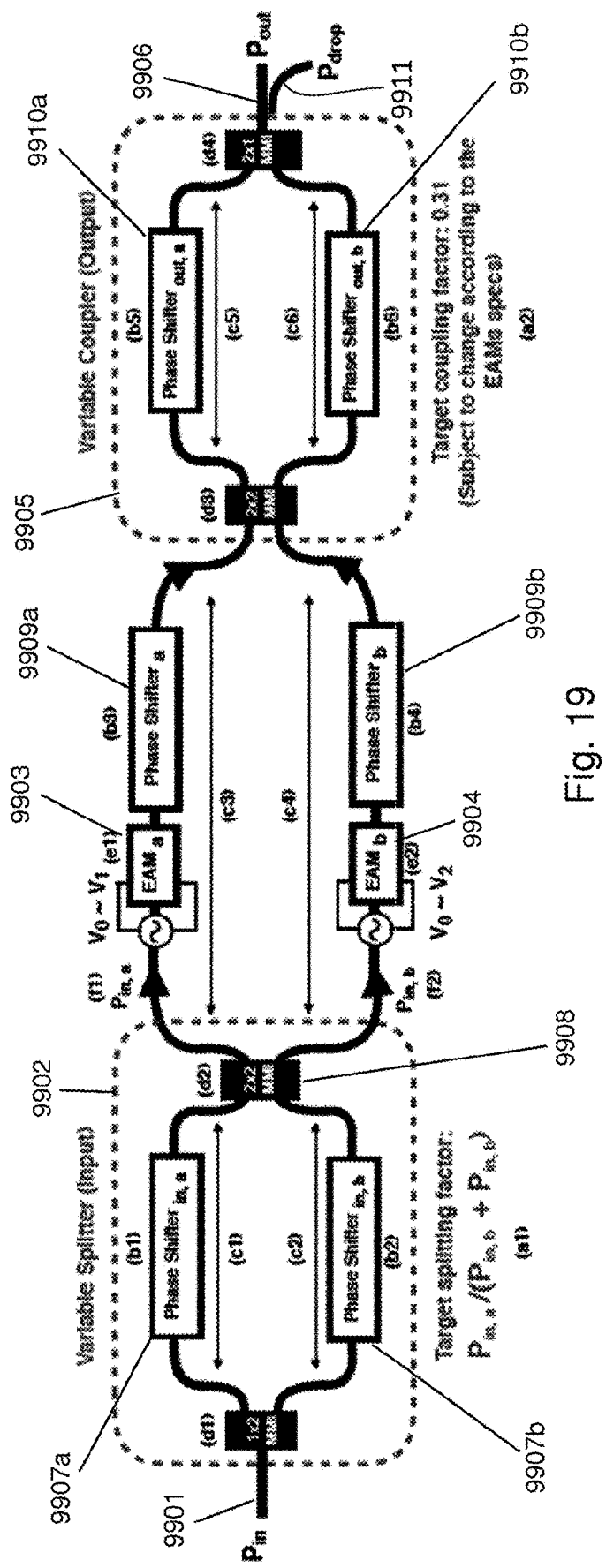
FIG. 19 shows a further variant optical device.

This is illustrated in FIG. 19, where a further variant device is illustrated. Broadly, the device includes: an input waveguide 9901, a variable input coupler 9902, a first electro-absorption modulator 9903 and a second electro-absorption modulator 9904, a variable output coupler 9905, and an output waveguide 9906.

The variable input coupler 9902 is formed of a first Mach-Zehnder interferometer, having arms b1 and b2. A 1×2 multimode interference coupler splits the light received from the input waveguide 9901 into each of the arms. The first arm b1 includes a phase shifter 9907a, and the second arm b2 includes a phase shifter 9907b. The resulting light is combined in a further multimode interference coupler 9908, before being divided again into the first electro-absorption modulator 9903 and the second electro-absorption modulator 9904. The first and second electro-absorption modulators are disposed within arms of a second Mach-Zehnder interferometer, and have associated phase shifters 9909a and 9909b.

The light is then transmitted into the variable output coupler 9905, which is formed of a third Mach-Zehnder interferometer having arms b5 and b6. Each of the arms b5 and b6 include respective phase shifters 9910a and 9910b. The light in the variable output coupler 9905 is then recombined in a 2×1 multimode interference coupler (MMI), before exiting the device via output waveguide 9906.

In all of the Mach-Zehnder interferometers, there may be more than one phase shifter. The arms of the Mach-Zehnder interferometers are generally parallel. A tap 9911 is present in the variable output coupler that allows a feedback signal to be obtained to bias and stabilize the phase shifters present in the device.

Figure 29:
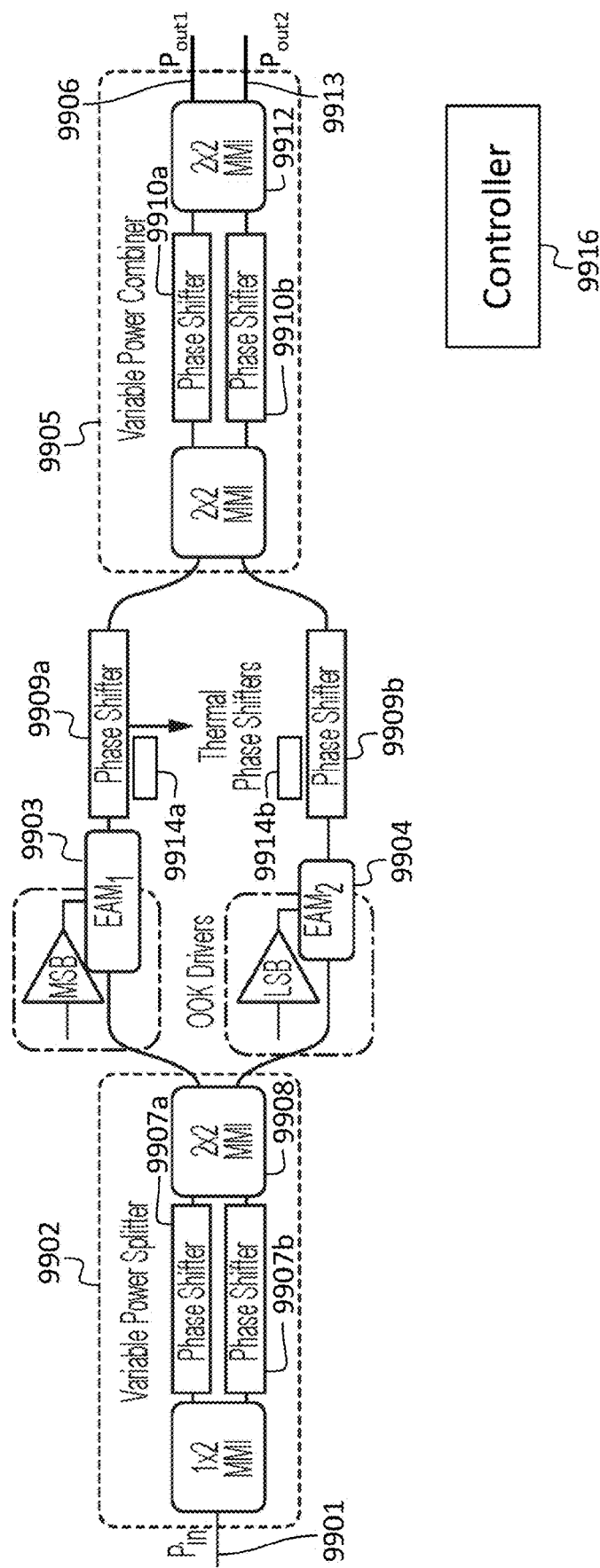
FIG. 29 shows an optical device.

FIG. 29 shows a device similar to that of FIG. 19. In the device of FIG. 29, a 2×2 MMI 9912 is used at the output instead of the combination, in FIG. 19, of a 2×1 MMI and the tap 9911. The 2×2 MMI 9912 may have a (power) coupling ratio of between 0.1% and 20.0%, i.e., of the optical power received by the 2×2 MMI 9912 from the arms b5 and b6, between 0.1% and 20.0% may be transmitted to the coupled output 9913 of the 2×2 MMI 9912, and the remainder, less any optical loss incurred in the 2×2 MMI 9912, may be transmitted to the output waveguide 9906.

In the second Mach-Zehnder interferometer, each of the phase shifters 9909a, 9909b may be thermally coupled to a respective heater of two heaters, a first heater 9914a and a second heater 9914b. Each heater may include, e.g., a resistive metal (e.g., tungsten) or semiconductor layer on or adjacent to a waveguide. Current driven through the resistive layer may cause the temperature of the heater, and the temperature of the waveguide, to increase, which may cause the phase delay of light propagating through the waveguide to change according to the thermo-optic coefficient of the material of the waveguide.

Each of the heaters 9914a, 9914b may also be thermally coupled to a respective one of the first electro-absorption modulator 9903 and the second electro-absorption modulator 9904, as a result, for example, of the proximity of each of the first electro-absorption modulator 9903 and the second electro-absorption modulator 9904 to a respective one of the phase shifters 9909a, 9909b and to a respective one of the heaters 9914a, 9914b. For example, some of the heat dissipated in the first heater 9914a may be conducted, (e.g., through the waveguide connecting the first heater 9914a to the first modulator 9903) to the first electro-absorption modulator 9903, causing its temperature to increase. The heating coefficient of each heater for the respective electro-absorption modulator may be between 0.01 and 2.0 of the heating coefficient of each heater for the respective phase shifter. As used herein, the "heating coefficient" of a heater for a component is the rate of change of temperature of the component with respect to power dissipated in the heater, under normal operating conditions (e.g., with the device mounted on a suitable heat sink at a normal operating temperature).

Each of the first electro-absorption modulator 9903 and the second electro-absorption modulator 9904 may have an extinction ratio (ER) and an insertion loss (IL), each of which is a function of both wavelength and temperature. As such, it may be advantageous to adjust the temperature of the first electro-absorption modulator 9903 and the second electro-absorption modulator 9904 such that the peak, as a function of wavelength, of the normalized extinction ratio is at, or near, the operating wavelength of the system (where the operating wavelength is, e.g., the wavelength of light generated by a laser supplying light to the device). As used herein, the "normalized extinction ratio" is the ratio of the extinction ratio to the insertion loss.

It may also be advantageous to adjust the temperature of each of the phase shifters 9909a, 9909b such that the phase difference in the two arms of the second Mach-Zehnder interferometer is at or near the correct operating point. The correct operating point may be one at which the phase difference is zero degrees (resulting in constructive interference at the output waveguide 9906) or within an offset angle of zero degrees (where the offset angle may be between 1 degree and 15 degrees (e.g., 5 degrees or 10 degrees) and selected to compensate for the phase modulation the EAMs 9903, 9904 may produce).

In some embodiments, the differential heater current (i.e., the difference between the current driven through the first heater 9914a and the current driven through the second heater 9914b) is adjusted so as to achieve the desired phase difference, and the common mode heater current (e.g., the average of the current (or the total current) driven through the first heater 9914a and the current driven through the second heater 9914b) is adjusted to so that the peak (as a function of wavelength) of the normalized extinction ratio of each of the first electro-absorption modulator 9903 and the second electro-absorption modulator 9904 is at or near the operating wavelength.

In some embodiments, the first electro-absorption modulator 9903 and the second electro-absorption modulator 9904 may be sufficiently different (e.g., having different lengths) that when the temperature is set such that the peak, as a function of wavelength, of the normalized extinction ratio of one of the electro-absorption modulators 9903, 9904 (which may be referred to simply as the peak of the modulator) is at the operating wavelength, the peak, as a function of wavelength, of the normalized extinction ratio of the other modulator is at a wavelength differing from the operating wavelength. In such a case, the common mode heater current (and the corresponding temperature) may be selected, e.g., such that (i) the peak of each modulator differs from the operating wavelength by less than a certain maximum offset, or (ii) the operating wavelength is between the peak of the first modulator and the peak of the second modulator. The maximum offset may be (i) between 0.1 nm and 10 nm or (ii) a constant times the separation between the peak of the first modulator and the peak of the second modulator, the constant being between 0.5 and 5.0.

In some embodiments, one or more additional heaters may be present (e.g., a heater may be on the first electro-absorption modulator 9903 or on the second electro-absorption modulator 9904); such a configuration may facilitate the independent temperature control of the first electro-absorption modulator 9903 and the second electro-absorption modulator 9904. Each of the phase shifters 9907a, 9907b, 9910a, 9910b in the first Mach-Zehnder interferometer and in the third Mach-Zehnder interferometer may also be controlled by a respective heater.

A control circuit 9916 (which may be or may include a processing circuit) may control the heaters, based on a feedback signal derived from the tap 9911 (FIG. 19) or derived from the coupled output of the 2×2 MMI 9912 (FIG. 29). The heater currents may be selected, for example, if four heater currents are to be controlled (one for each of two heaters 9914a, 9914b in the second Mach-Zehnder interferometer, one for a heater on one of the phase shifters 9907a, 9907b in the first Mach-Zehnder interferometer, and one for a heater on one of the phase shifters 9910a, 9910b in the third Mach-Zehnder interferometer), by performing an exhaustive search over a (4-dimensional) grid of heater current values (each point in the grid corresponding to a respective set of four respective heater current values for the four heaters), at each point testing the extent to which the modulation produced differs from ideal PAM-4 modulation (with evenly spaced levels). The set of heater current values that results in the best performance may then be selected as the operating point. In some embodiments another method (e.g., a search that is a log search along one or more of the dimensions, or a gradient descent method) may be employed instead of an exhaustive search.

Figure 20A:
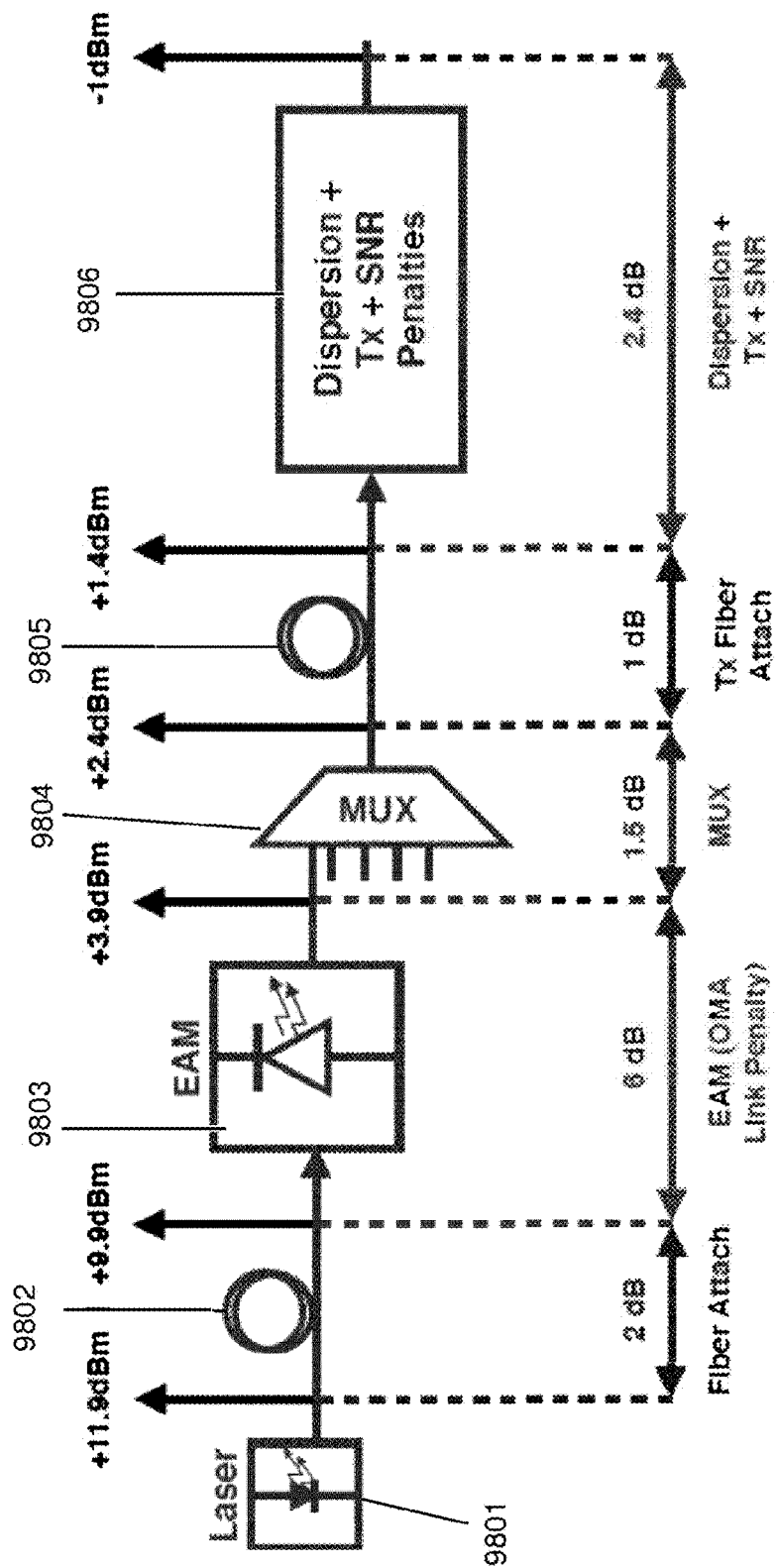
FIGS. 20A and 20B show a transmission system including the optical device of FIG. 12, FIG. 18, or FIG. 19.
Figure 20B:
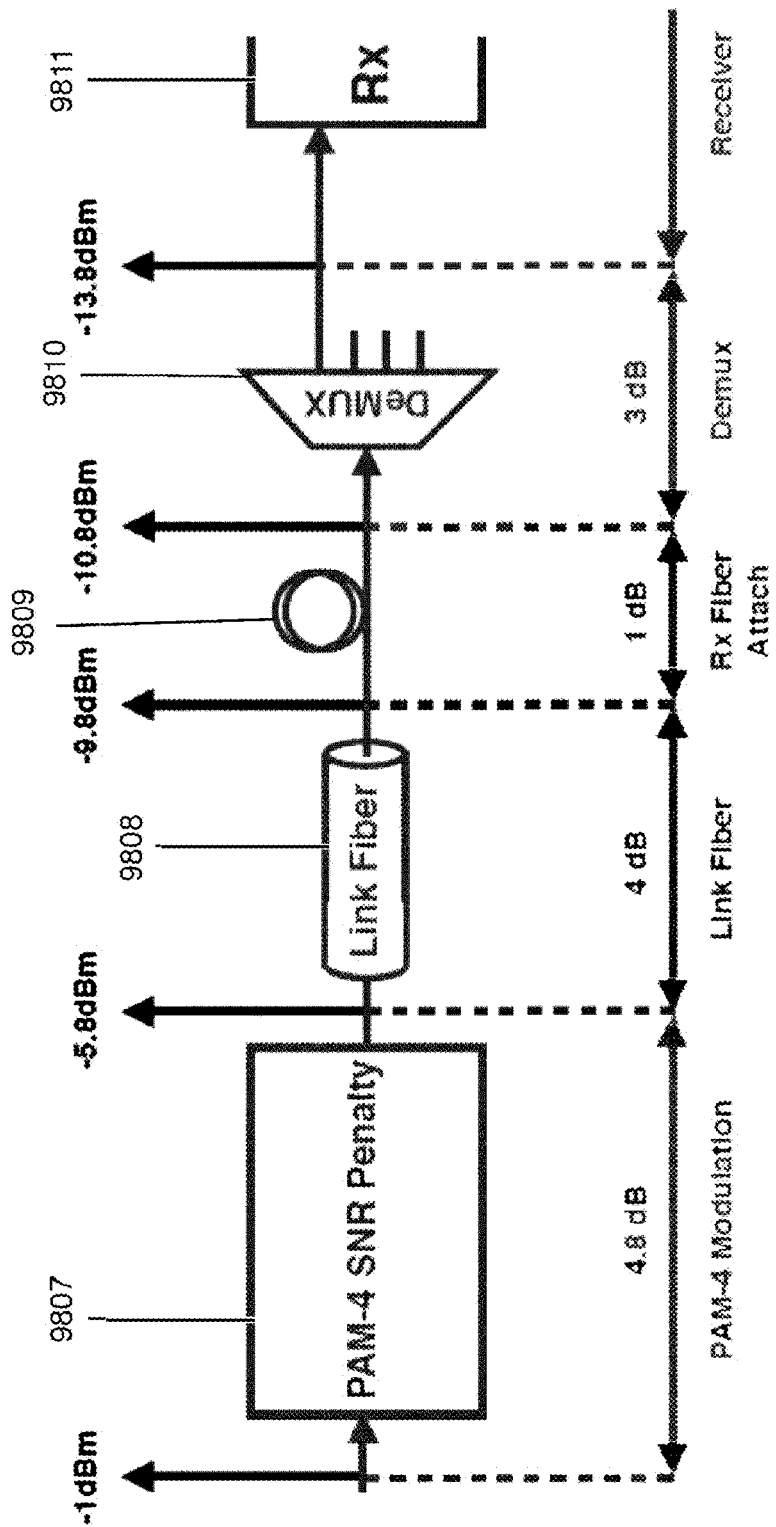
Figure 21:
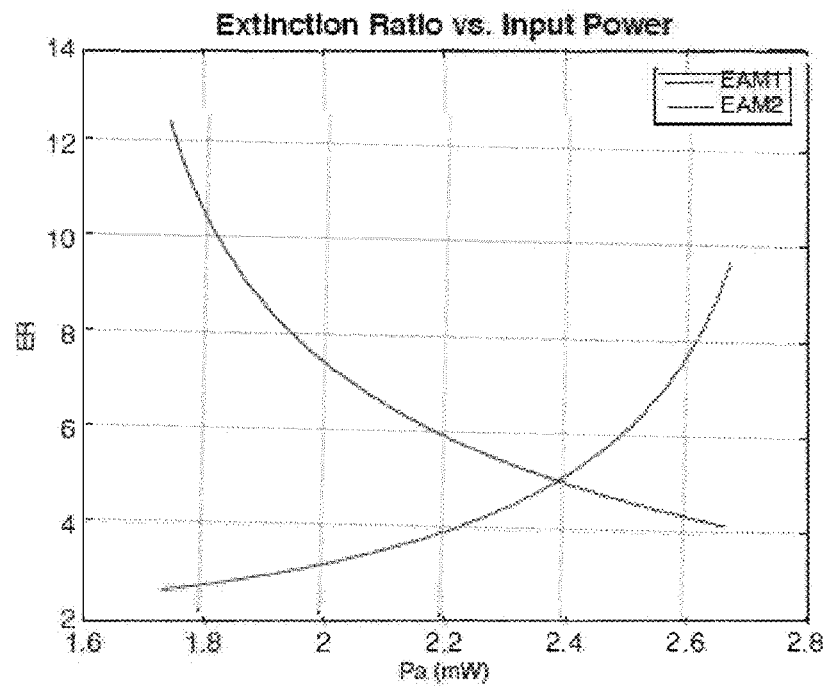
FIG. 21 shows a graph of extinction ratio vs. input power.
Figure 22:
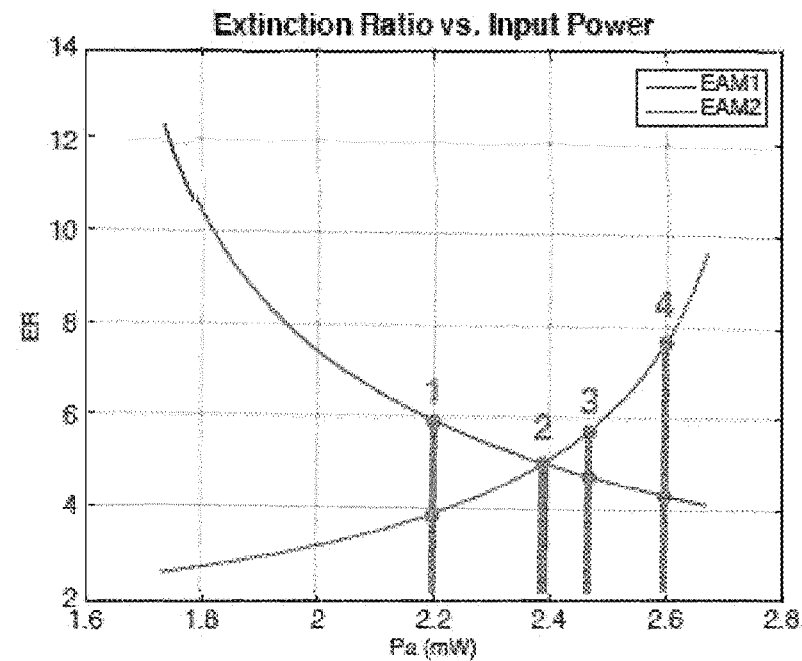
FIG. 22 shows a graph of extinction ratio vs. input power.
Figure 24:
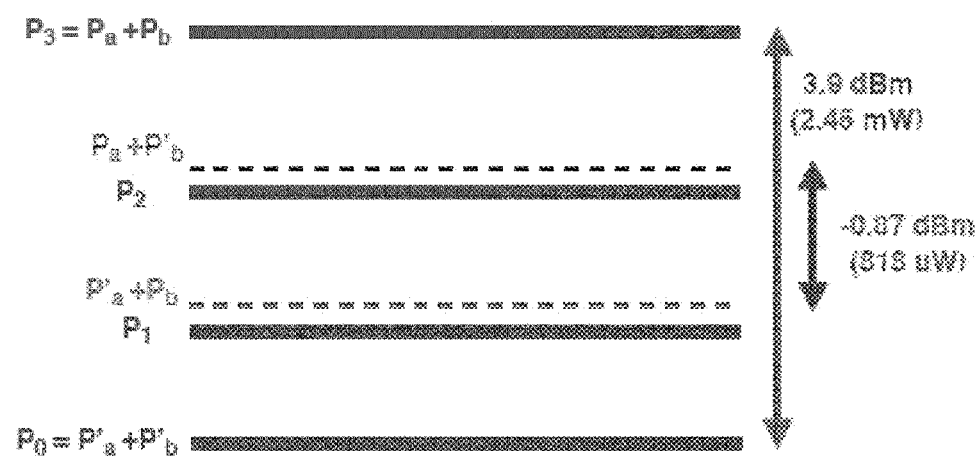
FIG. 24 shows a power level diagram.
Figure 26:
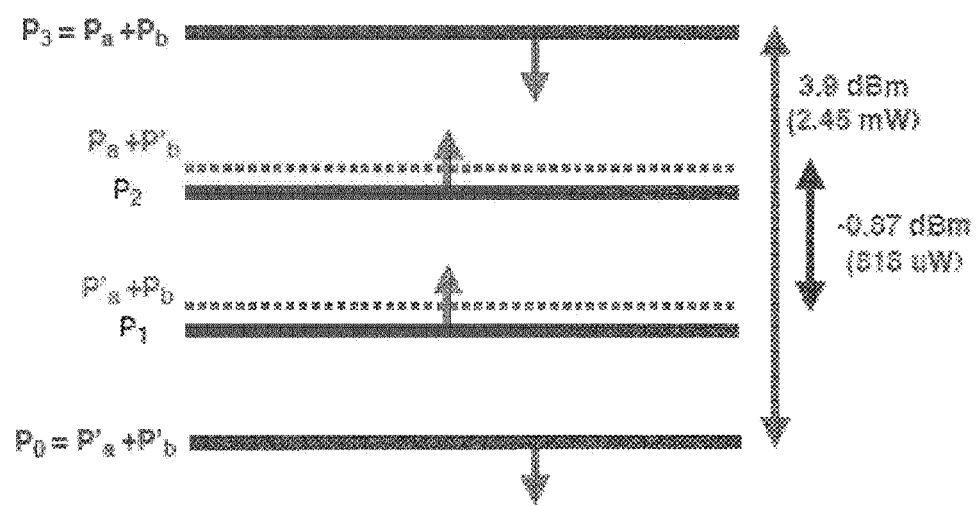
FIG. 26 shows a power level diagram.
Figure 28:
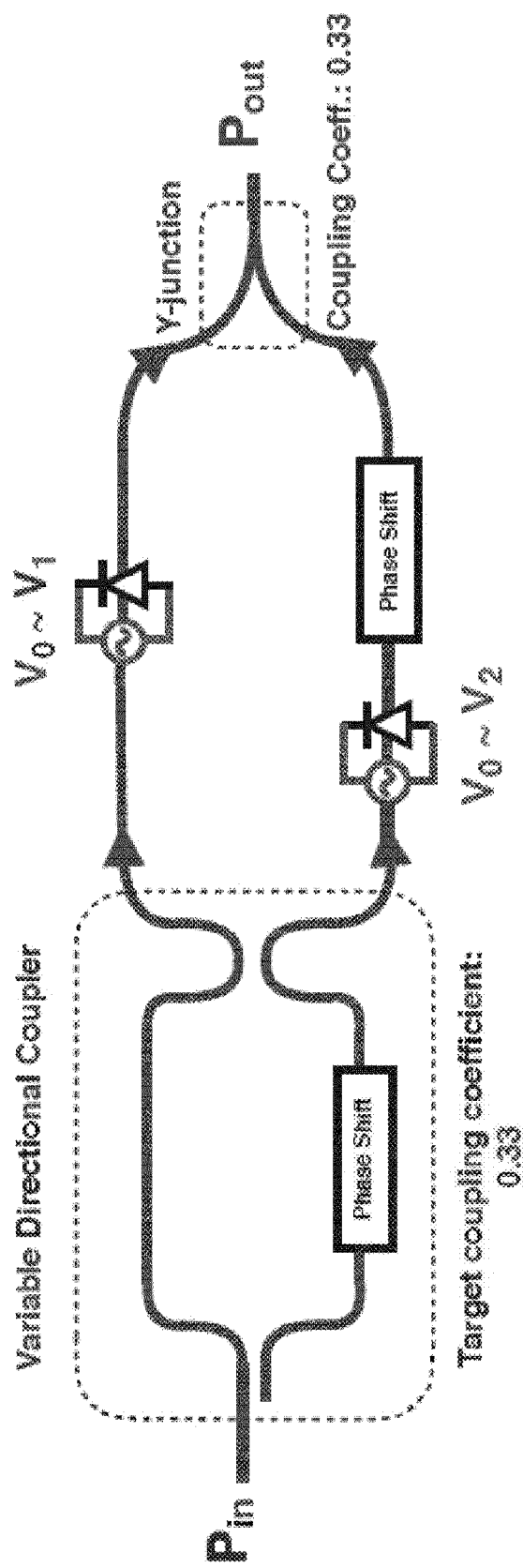
FIG. 28 shows an optical device.

FIGS. 20A and 20B show respective parts of a transmission system using the optical device described above and their desired properties.

The system starts from an optical source, in this case a laser 9801, producing light with a signal amplitude of around +11.9 dBm. The laser is coupled to a fibre 9802, which couples the light into a device 9803 according to the above description. The fibre should preferably incur no more than 2 dB loss at the attach points, and so the signal received by the device 9803 should have a signal amplitude of approximately +9.9 dBm. The device 9803 itself will incur a loss equivalent to the OMA link penalty, which may be approximately 6 dB. The result is a modulated signal with an OMA of approximately +3.9 dBm. This modulated signal is fed into a multiplexer 9804 'MUX' which may incur a loss of 1.5 dB, and so the resulting signal output OMA from the multiplexer is approximately +2.4 dBm. The light then passes through a Tx fibre 9805, which may incur a loss of around 1 dB at the attach point. Further losses are illustrated by box 9806 and 9807, which illustrate respectively the dispersion and transmission signal-to-noise ratio penalties (2.4 dB) and PAM-4 signal-to-noise ratio penalty (4.8 dB). The result is that a signal with an OMA of approximately −5.8 dBm is received by link fibre 9808. The link fibre 9808 can incur a loss of around 4 dB. The light then passes into an RX fibre 9809. The signal received by the Rx fibre should have an amplitude of approximately −9.8 dBm. The Rx fibre attach transmits the light into a demultiplexer 9810 'DeMUX', incurring a loss of around 1 dB at the attach point. The received signal by the demultiplexer may have an amplitude of approximately −10.8 dBm. Finally, the signal is received by receiver 9811, having incurred a loss in the demultiplexer of around 3 dB its amplitude may be approximately −13.3 dBm.

All of the devices described above may be used in a photonic integrated circuit, e.g., in a photonic integrated circuit fabricated on a silicon-on-insulator (SOI) wafer or on a double-silicon-on-insulator (DSOI) wafer.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, the word "or" is inclusive, so that, for example, "A or B" means any one of (i) A, (ii) B, and (iii) A and B. Any numerical range recited herein is intended to include all subranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The following numbered clauses contain statements of broad combinations of technical features in accordance with various aspects of the device and methods disclosed herein:

Clause

1. An optical device, operable to provide a PAM-N modulated output, comprising:
   an input waveguide, configured to receive light;
   a first electro-absorption modulator, coupled to receive light from the input waveguide, and operable to produce a first output or a second output, wherein the second output has a lower amplitude than the first output;
   a second electro-absorption modulator, coupled to receive light from the input waveguide, and operable to produce a third output or a fourth output, wherein the fourth output has a lower amplitude than the third output; and
   an output waveguide, coupled to receive light from the first electro-absorption modulator and the second electro-absorption modulator, and output a combined signal comprising an output of the first electro-absorption modulator and an output of the second electro-absorption modulator;
   wherein the first electro-absorption modulator and the second electro-absorption modulator are disposed in parallel.

2. The optical device of clause 1 further comprising:
   a variable input coupler, disposed between the input waveguide and both of the first electro-absorption modulator and the second electro-absorption modulator.

3. The optical device of clause 2, wherein the input coupler is configured to modify the light transmitted to the first electro-absorption modulator and the second electro-absorption modulator such that adjacent PAM-N modulated outputs generated by the device are linearly spaced.

4. The optical device of either clause 2 or clause 3, wherein the input coupler is configured to unequally split input light between the first electro-absorption modulator and the second electro-absorption modulator.

5. The optical device of any of clauses 2-4, wherein the input coupler comprises a Mach-Zehnder interferometer, comprising an input coupler coupled to the input waveguide, two parallel arms and an output coupler.

6. The optical device of clause 5, wherein at least one of the parallel arms includes a phase-shifter.

7. The optical device of any of clauses 1-6, wherein, disposed between the output waveguide and the first electro-absorption modulator and the second electro-absorption modulator is a variable output coupler.

8. The optical device of clause 7, wherein the output coupler is configured to modify the received light from the first electro-absorption modulator and the second electro-absorption modulator such that adjacent PAM-N modulated outputs are linearly spaced.

9. The optical device of either clause 7 or clause 8, wherein the output power of light which can be outputted by the coupler is described by:

$$P_{OUT} = \left| \sqrt{(1-k)P_{in1}}\, e^{j\theta_1} + \sqrt{(k)P_{in2}}\, e^{j\theta_2} \right|^2$$

where $P_{OUT}$ is the output power, k is a coupling coefficient $P_{in1}$ is the input power from the first electro-absorption modulator, $\theta_1$ is the phase of light entering the coupler from the first electro-absorption modulator, $P_{in2}$ is the input power from the second electro-absorption modulator, and 82 is the phase of light entering the coupler from the second electro-absorption modulator.

10. The optical device of clause 9, wherein k is less than 0.44.

11. The optical device of any of clauses 7-10, wherein the variable output coupler is a Mach-Zehnder interferometer, comprising an input coupler coupled to the first electro-absorption modulator and the second electro-absorption modulator, two parallel arms and an output coupler coupled to the output waveguide.

12. The optical device of clause 11, wherein at least one of the parallel arms includes a phase-shifter.

13. The optical device of any of clauses 1-12, further comprising:
a first analogue driver, said first driver configured to provide a first driver signal to the first electro-absorption modulator; and
a second analogue driver, said second driver configured to provide a second driver signal to the second electro-absorption modulator;
wherein, when driven by the respective driver signal, the first electro-absorption modulator produces the second output and the second electro-absorption modulator produces the fourth output.

14. The optical device of clause 13, wherein the first driver signal and the second driver signal are identical.

15. The optical device of any of clauses 1-14, wherein the optical device includes a Mach-Zehnder interferometer, and the first electro-absorption modulator is disposed within a first arm of the Mach-Zehnder interferometer and the second electro-absorption modulator is disposed within a second arm of the Mach-Zehnder interferometer.

16. The optical device of any of clauses 1-15, wherein the device includes a phase-shifter associated with at least one of the electro-absorption modulators, said phase-shifter being operable to modify a phase shift associated with the respective electro-absorption modulator.

17. The optical device of clause 16 as dependent on clause 15, wherein the phase-shifter is disposed within an arm of the Mach-Zehnder interferometer.

18. The optical device of either clause 16 or 17, wherein the phase-shifter is any one or more of: a heater; a PIN phase shifter; or a PN phase shifter.

19. The optical device of any of clauses 15-18, further including a directional coupler coupled to the output waveguide, configured to redirect a portion of the output power for use to bias and stabilize the phase shifter.

20. The optical device of clause 19, wherein the portion of the output power is less than 5%.

21. A Mach-Zehnder interferometer, comprising:
an input waveguide;
an output waveguide;
a first arm, optically connecting the input waveguide and the output waveguide;
a second arm, optically connecting the input waveguide and the output waveguide, the second arm being disposed in parallel with the first arm; and
at least two electro-absorption modulators, disposed respectively in the first arm and the second arm, and operable to provide PAM-N modulation.

What is claimed is:

1. An optoelectronic device for modulation, comprising:
an input waveguide;
a first intermediate waveguide and a second intermediate waveguide, each coupled to the input waveguide via an input coupler; and
an output waveguide, coupled, via an output coupler, to the first intermediate waveguide and to the second intermediate waveguide,
wherein:
the first intermediate waveguide includes a first modulating component connected in series with a first phase shifting component; and
the second intermediate waveguide includes a second modulating component connected in series with a second phase shifting component,
wherein:
the input coupler is a variable input coupler; or
the output coupler is a variable output coupler,
wherein the input coupler comprises a first Mach-Zehnder interferometer,
wherein the first Mach-Zehnder interferometer comprises a multimode interference (MMI) coupler,
wherein the optoelectronic device comprises a second Mach-Zehnder interferometer, the second Mach-Zehnder interferometer including:
as a variable input coupler of the second Mach-Zehnder interferometer, the first Mach-Zehnder interferometer;
as a first arm of the second Mach-Zehnder interferometer, the first intermediate waveguide;
as a second arm of the second Mach-Zehnder interferometer, the second intermediate waveguide; and
as a variable output coupler of the second Mach-Zehnder interferometer, a third Mach-Zehnder interferometer, and
wherein the third Mach-Zehnder interferometer comprises, as an output coupler of the third Mach-Zehnder interferometer, a 2×2 multimode interference coupler having an unequal coupling ratio.

2. The optoelectronic device of claim 1, wherein the coupling ratio is between 0.1% and 10.0%.

3. A method, comprising:
receiving light, in the input waveguide, and
applying a modulation to the received light, with the optoelectronic device of claim 1.

4. The method of claim 3, wherein the coupling ratio is between 0.1% and 10.0%.

5. The method of claim 3, further comprising:
a first heater on the first intermediate waveguide; and
a second heater on the second intermediate waveguide.

6. The method of claim 5, wherein a heating coefficient of the first heater for the first modulating component is at least 0.01 of a heating coefficient of the first heater for the first phase shifting component.

7. The method of claim 6, further comprising:
maintaining a relative phase in the first arm and in the second arm, at a first operating point,
maintaining a wavelength of maximum normalized extinction ratio for the first modulating component at a second operating point, and
maintaining a wavelength of maximum normalized extinction ratio for the second modulating component at a third operating point.

8. An optoelectronic device for modulation, comprising:
an input waveguide;
a first intermediate waveguide and a second intermediate waveguide, each coupled to the input waveguide via an input coupler;
an output waveguide, coupled, via an output coupler, to the first intermediate waveguide and to the second intermediate waveguide;
a first heater on the first intermediate waveguide; and
a second heater on the second intermediate waveguide,
wherein:
the first intermediate waveguide includes a first modulating component connected in series with a first phase shifting component; and
the second intermediate waveguide includes a second modulating component connected in series with a second phase shifting component,
wherein:
the input coupler is a variable input coupler; or
the output coupler is a variable output coupler,
wherein the input coupler comprises a first Mach-Zehnder interferometer,
wherein the first Mach-Zehnder interferometer comprises a multimode interference (MMI) coupler, and
wherein the optoelectronic device comprises a second Mach-Zehnder interferometer, the second Mach-Zehnder interferometer including:
as a variable input coupler of the second Mach-Zehnder interferometer, the first Mach-Zehnder interferometer;
as a first arm of the second Mach-Zehnder interferometer, the first intermediate waveguide;
as a second arm of the second Mach-Zehnder interferometer, the second intermediate waveguide; and
as a variable output coupler of the second Mach-Zehnder interferometer, a third Mach-Zehnder interferometer.

9. The optoelectronic device of claim 8, wherein a heating coefficient of the first heater for the first modulating component is at least 0.01 of a heating coefficient of the first heater for the first phase shifting component.

10. A system, comprising an optoelectronic device for modulation and a control circuit, wherein the optoelectronic device comprises:
an input waveguide;
a first intermediate waveguide and a second intermediate waveguide, each coupled to the input waveguide via an input coupler; and
an output waveguide, coupled, via an output coupler, to the first intermediate waveguide and to the second intermediate waveguide,
wherein:
the first intermediate waveguide includes a first modulating component connected in series with a first phase shifting component; and
the second intermediate waveguide includes a second modulating component connected in series with a second phase shifting component,
wherein:
the input coupler is a variable input coupler; or
the output coupler is a variable output coupler,
wherein the input coupler comprises a first Mach-Zehnder interferometer,
wherein the first Mach-Zehnder interferometer comprises a multimode interference (MMI) coupler,
wherein the optoelectronic device comprises a second Mach-Zehnder interferometer, the second Mach-Zehnder interferometer including:
as a variable input coupler of the second Mach-Zehnder interferometer, the first Mach-Zehnder interferometer;
as a first arm of the second Mach-Zehnder interferometer, the first intermediate waveguide;
as a second arm of the second Mach-Zehnder interferometer, the second intermediate waveguide; and
as a variable output coupler of the second Mach-Zehnder interferometer, a third Mach-Zehnder interferometer, and
wherein the control circuit is configured to control a plurality of heaters, to:
maintain a relative phase in the first arm and in the second arm, at a first operating point,
maintain a wavelength of maximum normalized extinction ratio for the first modulating component at a second operating point, and
maintain a wavelength of maximum normalized extinction ratio for the second modulating component at a third operating point.

* * * * *

UNITED STATES PATENT AND TRADEMARK OFFICE
CERTIFICATE OF CORRECTION

PATENT NO. : 12,001,115 B2
APPLICATION NO. : 17/712036
DATED : June 4, 2024
INVENTOR(S) : Arian Hashemi Talkhooncheh et al.

It is certified that error appears in the above-identified patent and that said Letters Patent is hereby corrected as shown below:

On the Title Page

Please amend the Assignees as follows:
(73) Assignees: Rockley Photonics Limited, Altrincham (GB); California Institute of Technology, Pasadena, CA (US)

Signed and Sealed this
Tenth Day of September, 2024

Katherine Kelly Vidal
*Director of the United States Patent and Trademark Office*